(12) United States Patent
Leiber et al.

(10) Patent No.: US 11,104,317 B2
(45) Date of Patent: Aug. 31, 2021

(54) BRAKE DEVICE AND METHOD FOR OPERATING A BRAKE DEVICE

(71) Applicant: IPGATE AG, Pfäffikon (CH)

(72) Inventors: Heinz Leiber, Oberriexingen (DE);
Thomas Leiber, Rogoznica (HR);
Valentin Unterfrauner, Munich (DE);
Christian Köglsperger, Geretsried (DE)

(73) Assignee: IPGATE AG, Pfäffikon Sz (CH)

( * ) Notice: Subject to any disclaimer, the term of this patent is extended or adjusted under 35 U.S.C. 154(b) by 84 days.

(21) Appl. No.: 16/174,437

(22) Filed: Oct. 30, 2018

(65) Prior Publication Data

US 2019/0061726 A1 Feb. 28, 2019

Related U.S. Application Data

(63) Continuation of application No. 15/022,394, filed as application No. PCT/EP2014/069650 on Sep. 16, 2014, now Pat. No. 10,112,592.

(30) Foreign Application Priority Data

Sep. 16, 2013 (DE) ...................... 10 2013 110 188.7
Oct. 30, 2013 (DE) ...................... 10 2013 111 974.3
Feb. 26, 2014 (DE) ...................... 10 2014 102 536.9

(51) Int. Cl.
*B60T 13/68* (2006.01)
*B60T 8/40* (2006.01)
*B60T 13/74* (2006.01)

(52) U.S. Cl.
CPC .......... *B60T 13/686* (2013.01); *B60T 8/4077* (2013.01); *B60T 8/4081* (2013.01); *B60T 13/745* (2013.01); *B60T 2270/82* (2013.01)

(58) Field of Classification Search
CPC . B60T 8/00; B60T 8/44; B60T 13/343; B60T 13/344; B60T 13/368; B60T 13/686; B60T 13/745
(Continued)

(56) References Cited

U.S. PATENT DOCUMENTS 4,365,683 A 12/1982 Adams
4,480,877 A 11/1984 Resch
(Continued)

FOREIGN PATENT DOCUMENTS

DE 19817190 C1 7/1999
DE 102005055751 A1 11/2006
(Continued)

OTHER PUBLICATIONS

Int'l Preliminary Report on Patentability dated Mar. 31, 2016 in International Application No. PCT/EP2014/069650.
(Continued)

*Primary Examiner* — Christopher P Schwartz
(74) *Attorney, Agent, or Firm* — Panitch Schwarze Belisario & Nadel LLP

(57) ABSTRACT

The invention relates to a brake device and a method for operating a brake device, wherein said brake device comprises an actuation device, also a booster device, in particular having an electro-hydraulic drive, a piston cylinder device (main cylinder) in order to supply hydraulic pressure medium to the brake circuits, a valve device for controlling or regulating the supply of the pressure medium and an electronic control or regulating device. According to the invention provision is made for additional pressure medium volume to be supplied in a controlled manner to at least one brake circuit by means of a further piston cylinder device, in particular a double stroke piston and at least one valve controlled by the control or regulating device.

50 Claims, 15 Drawing Sheets

(58) Field of Classification Search
USPC .......................... 303/3, 15, 20, 114.1, 115.2
See application file for complete search history.

(56) References Cited

U.S. PATENT DOCUMENTS

| | | | |
|---|---|---|---|
| 4,624,108 A * | 11/1986 | Leiber | B60T 13/145 303/114.2 |
| 5,836,659 A * | 11/1998 | Feigel | B60T 8/00 303/115.2 |
| 6,007,161 A * | 12/1999 | Worsdorfer | B60T 7/042 303/115.2 |
| 6,494,545 B2 * | 12/2002 | Nakamura | B60T 8/4081 138/30 |
| 8,540,324 B2 | 9/2013 | Leiber et al. | |
| 9,096,205 B2 * | 8/2015 | Schiel | B60T 13/662 |
| 9,168,481 B2 | 10/2015 | Wedemann et al. | |
| 9,174,617 B2 * | 11/2015 | Feigel | B60T 8/4845 |
| 2001/0020800 A1 | 9/2001 | Isono et al. | |
| 2004/0055452 A1 | 3/2004 | Tabor | |
| 2009/0115247 A1 | 5/2009 | Leiber et al. | |
| 2010/0026083 A1 * | 2/2010 | Leiber | B60T 8/44 303/3 |
| 2012/0169112 A1 | 7/2012 | Jungbecker et al. | |
| 2012/0198959 A1 | 8/2012 | Leiber et al. | |
| 2012/0228925 A1 * | 9/2012 | Baechle | B60T 8/4872 303/10 |
| 2012/0256477 A1 * | 10/2012 | Miyazaki | B60T 8/885 303/6.01 |
| 2012/0326492 A1 | 12/2012 | Mayer | |
| 2013/0187442 A1 * | 7/2013 | Kong | B60T 15/38 303/28 |
| 2013/0234501 A1 * | 9/2013 | Leiber | B60T 8/4018 303/10 |
| 2013/0291535 A1 | 11/2013 | Leiber et al. | |
| 2013/0298550 A1 | 11/2013 | Leiber et al. | |
| 2015/0344014 A1 * | 12/2015 | Knechtges | B60T 13/745 701/70 |
| 2015/0353067 A1 * | 12/2015 | Knechtges | B60T 7/042 701/70 |
| 2016/0297413 A1 * | 10/2016 | Alford | B60T 8/4081 |

FOREIGN PATENT DOCUMENTS

| | | | |
|---|---|---|---|
| DE | 102006030141 A1 | | 1/2008 |
| DE | 102006061462 A1 | | 7/2008 |
| DE | 102007062839 A1 | | 6/2009 |
| DE | 102008057582 A1 | | 5/2010 |
| DE | 102010040097 A1 | | 3/2011 |
| DE | 102009048763 A1 | | 4/2011 |
| DE | 102011080312 A1 | | 2/2012 |
| DE | 102010044754 A1 | | 3/2012 |
| DE | 102010045617 A1 | | 3/2012 |
| DE | 102010050133 A1 | | 5/2012 |
| DE | 102011009059 A1 | | 7/2012 |
| DE | 102011081601 A1 | | 7/2012 |
| DE | 102011005404 A1 | | 9/2012 |
| DE | 102011080312 | * | 9/2012 .............. B60T 13/66 |
| DE | 102011007672 A1 | | 10/2012 |
| DE | 102011111368 A1 | | 2/2013 |
| DE | 102011112515 A1 | | 2/2013 |
| DE | 102013105377 A1 | | 11/2014 |
| DE | 102013111974 A1 | | 4/2015 |
| EP | 2217478 A1 | | 8/2010 |
| EP | 1874602 B1 | | 12/2012 |
| JP | H10252705 A | | 9/1998 |
| WO | 2009059619 A1 | | 5/2009 |
| WO | 2012017037 A2 | | 2/2012 |
| WO | 2012028568 A1 | | 3/2012 |
| WO | 2012031718 A2 | | 3/2012 |
| WO | 2013030113 A1 | | 3/2013 |

OTHER PUBLICATIONS

Int'l Preliminary Report on Patentability dated Mar. 31, 2016 in International Application No. PCT/EP2014/0696723.
International Search Report dated Mar. 30, 2015 in International Application No. PCT/EP2014/069650.
International Search Report dated Mar. 30, 2015 in International Application No. PCT/EP2014/069723.
Search Report dated Jul. 10, 2014 in DE Application No. 102013111974.3.
Search Report dated Jul. 28, 2014 in DE Application No. 102013110188.7.

* cited by examiner

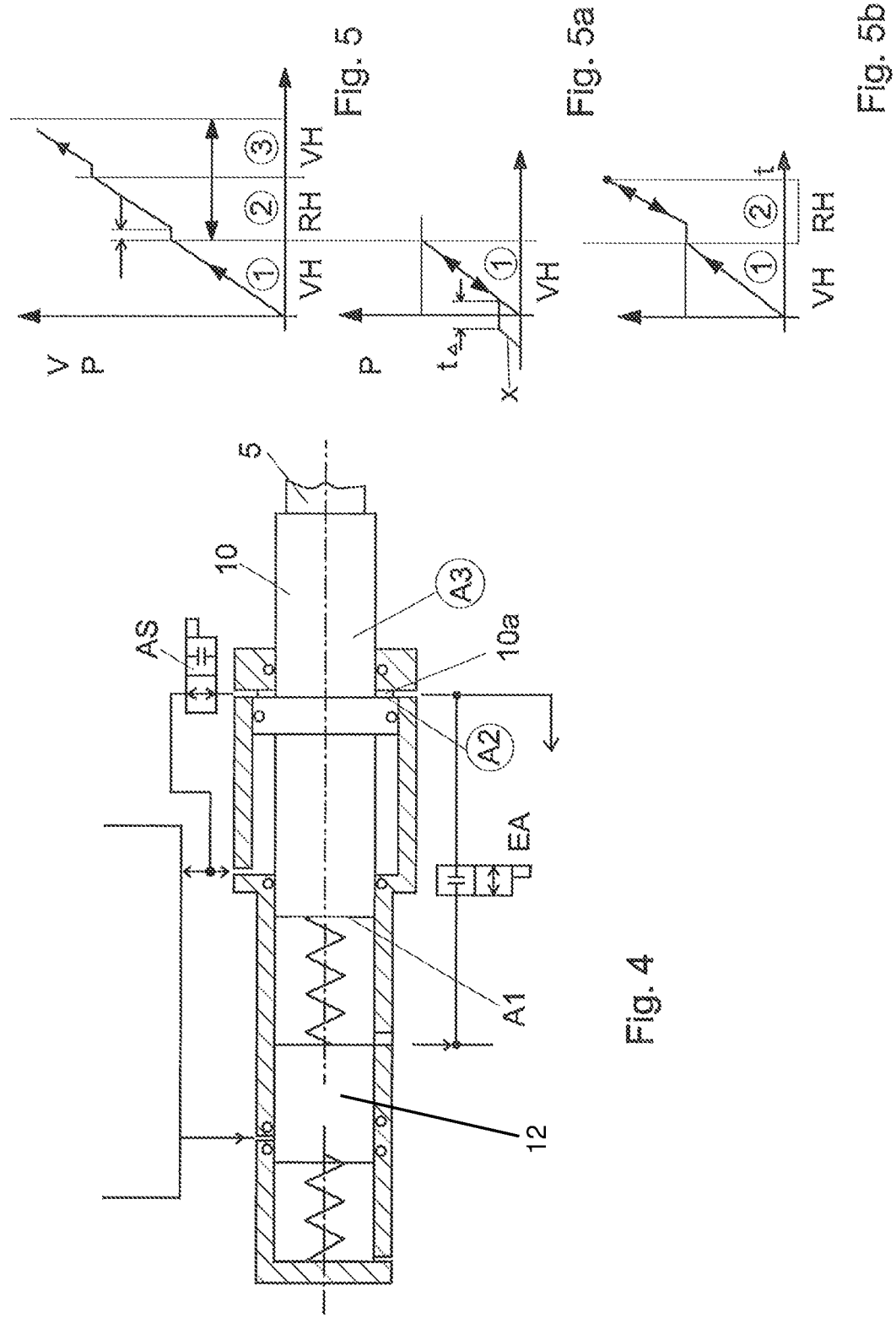

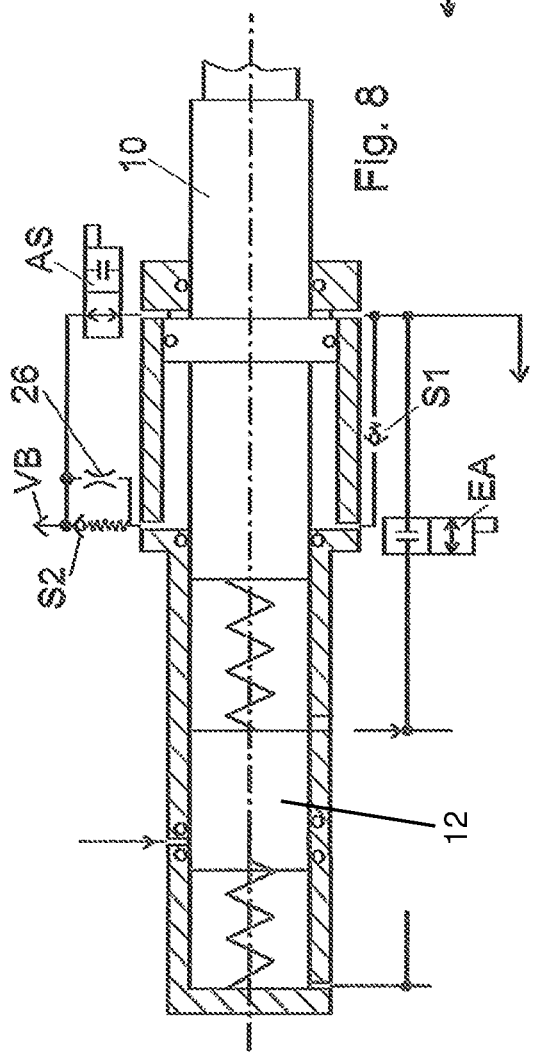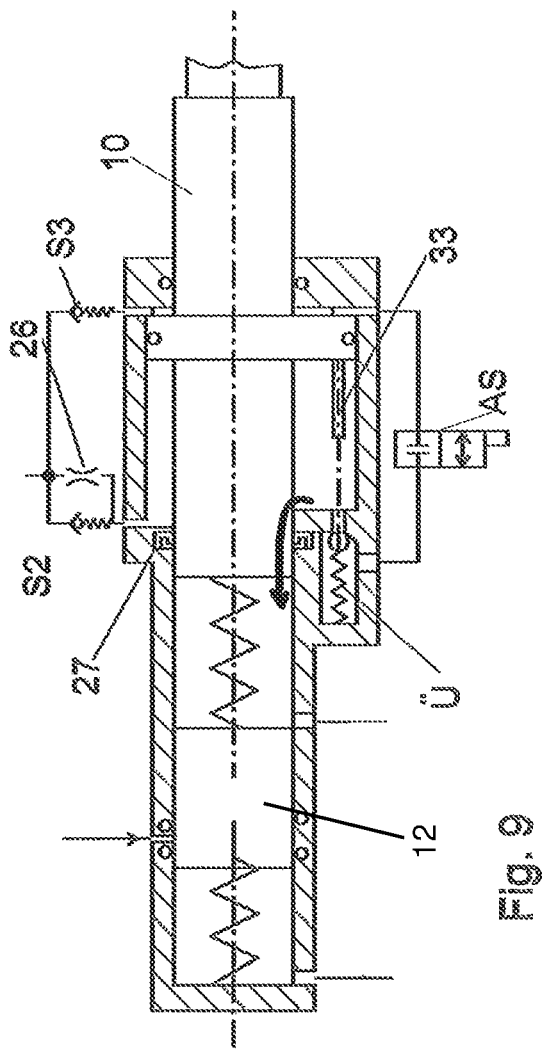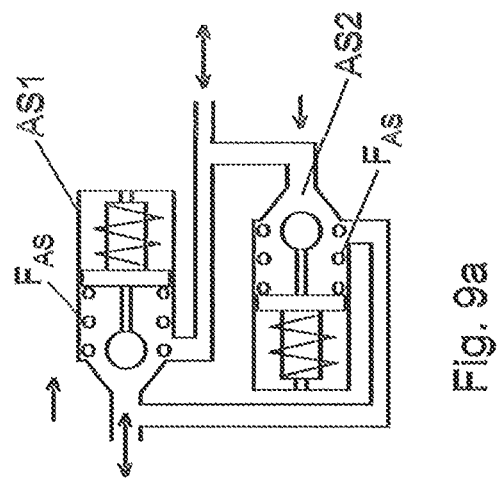

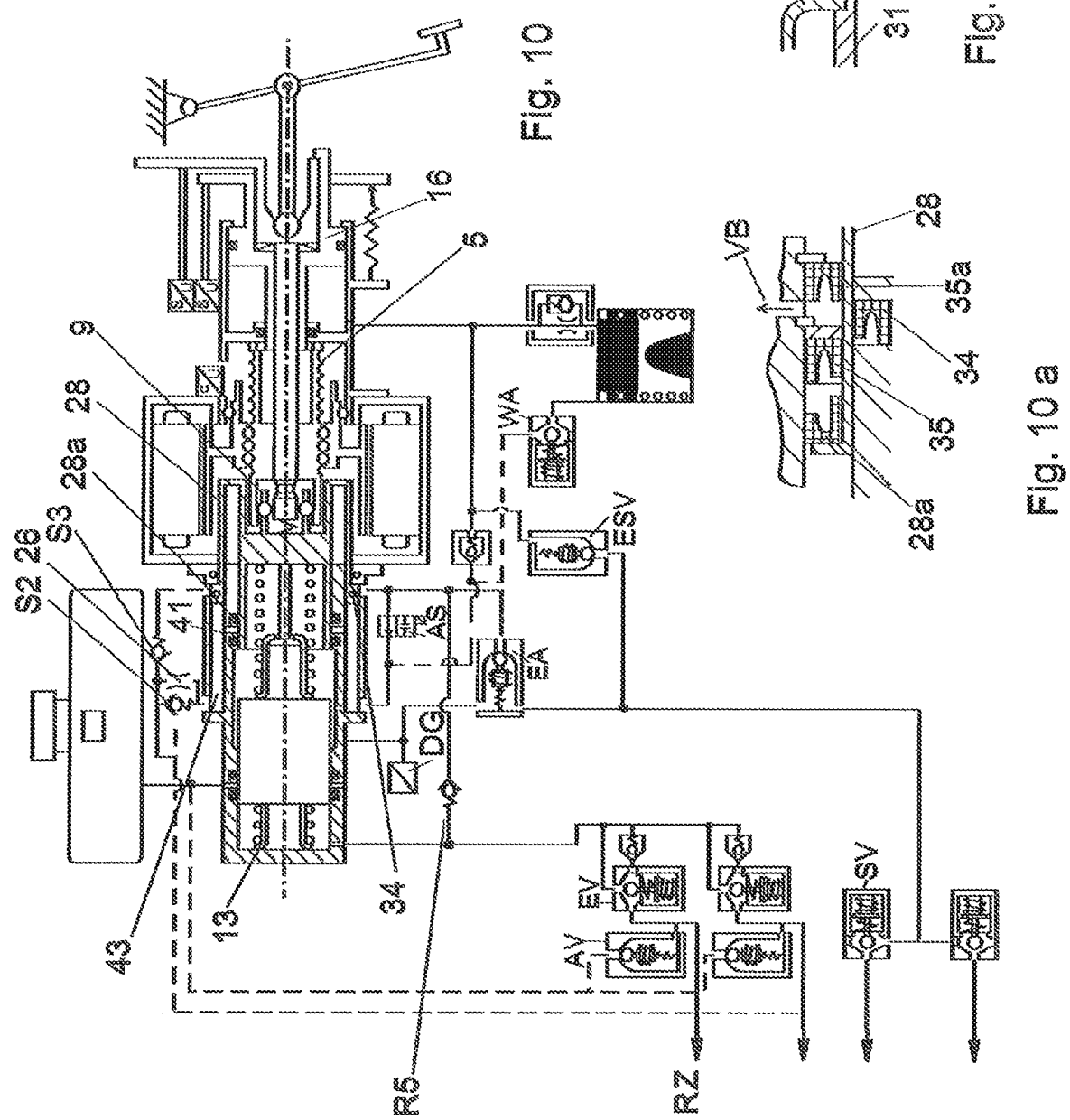

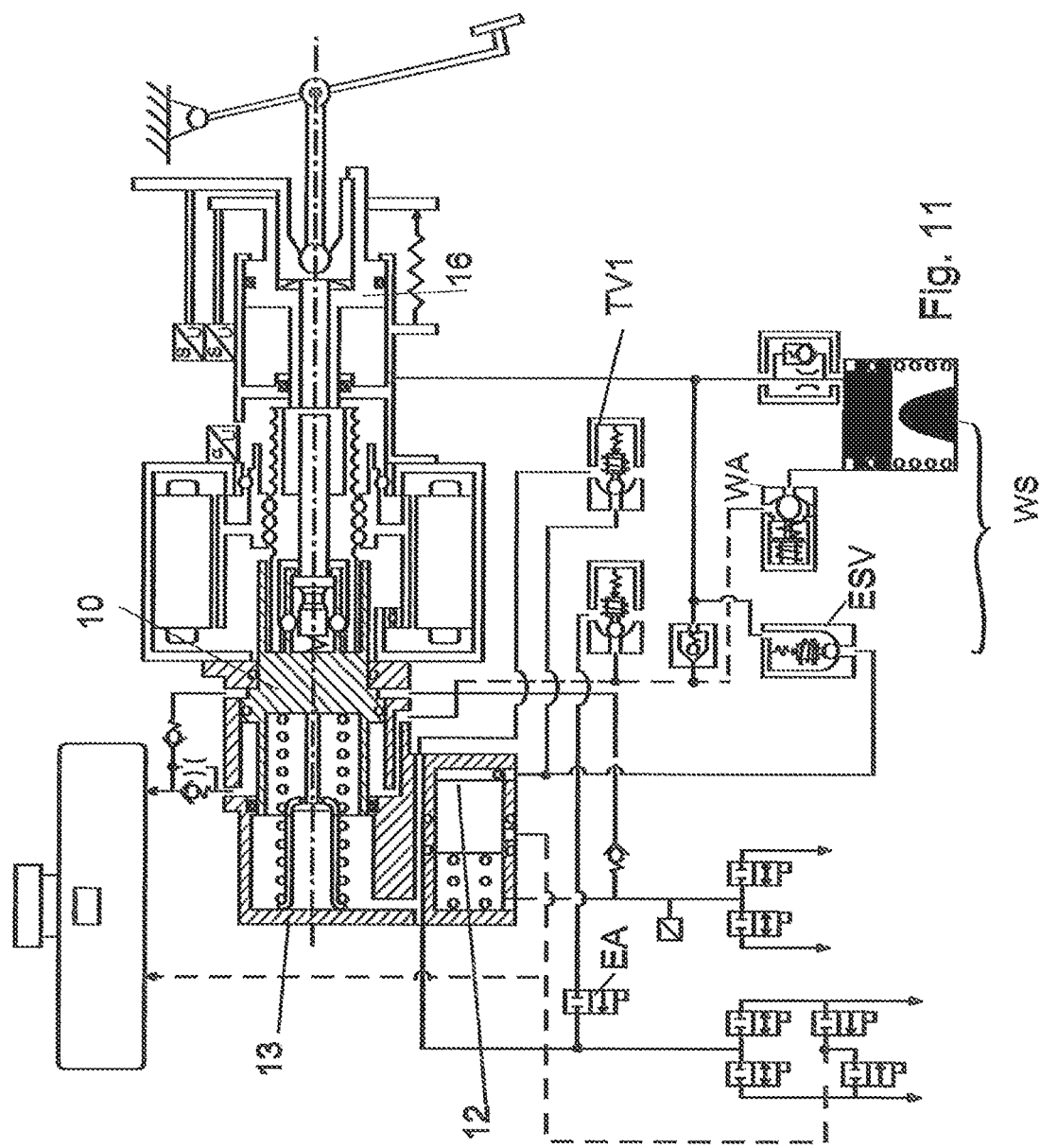

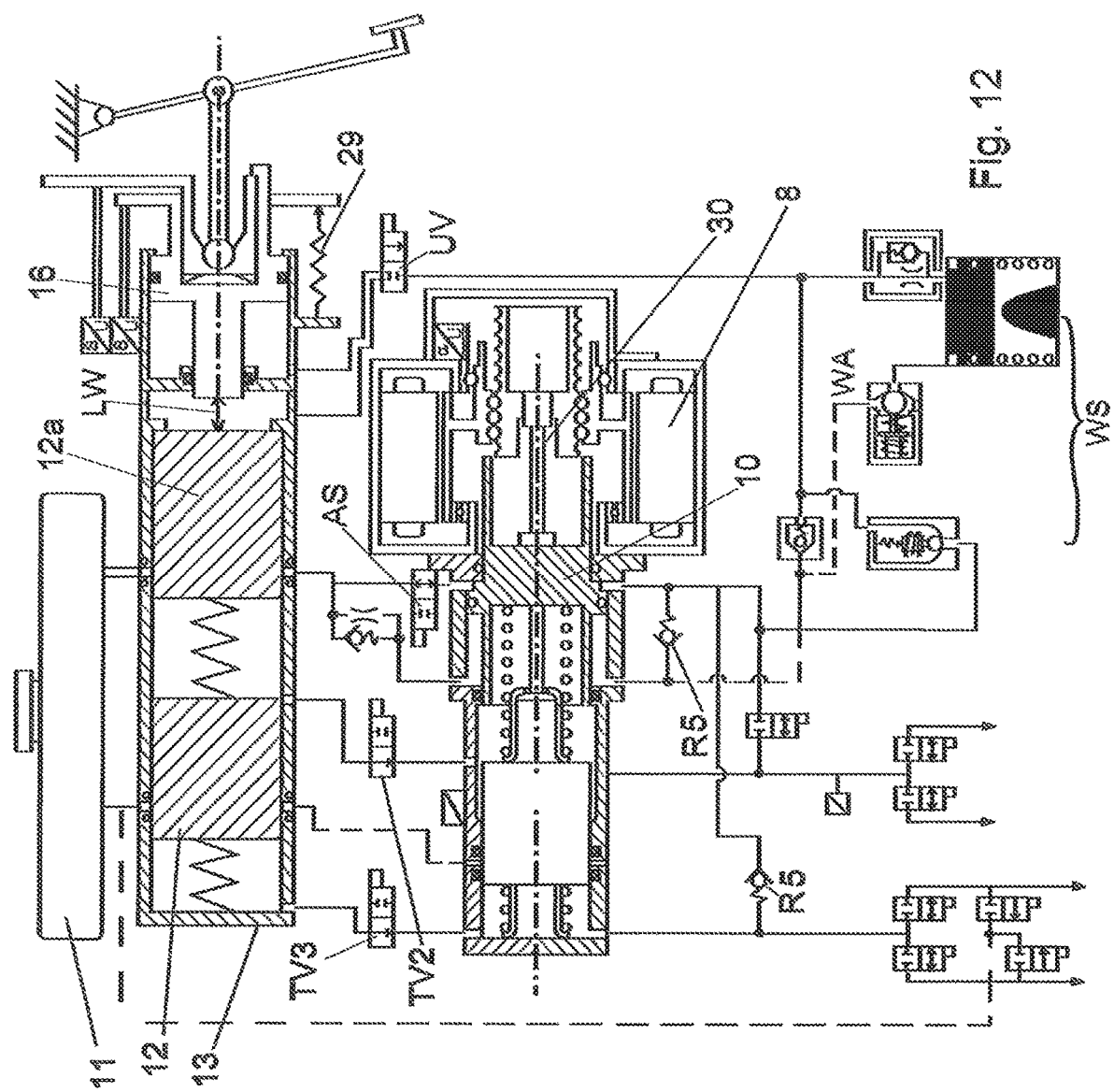

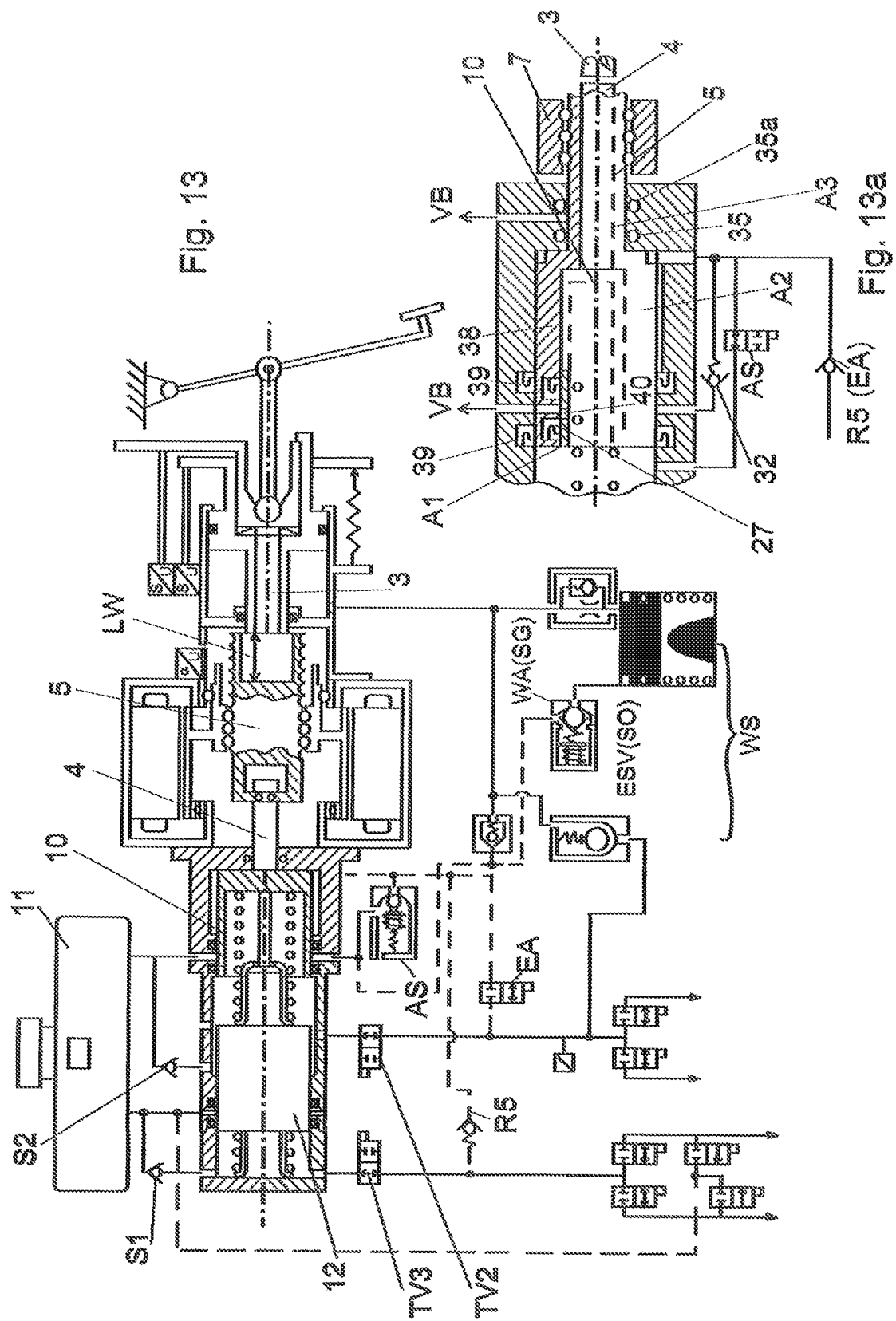

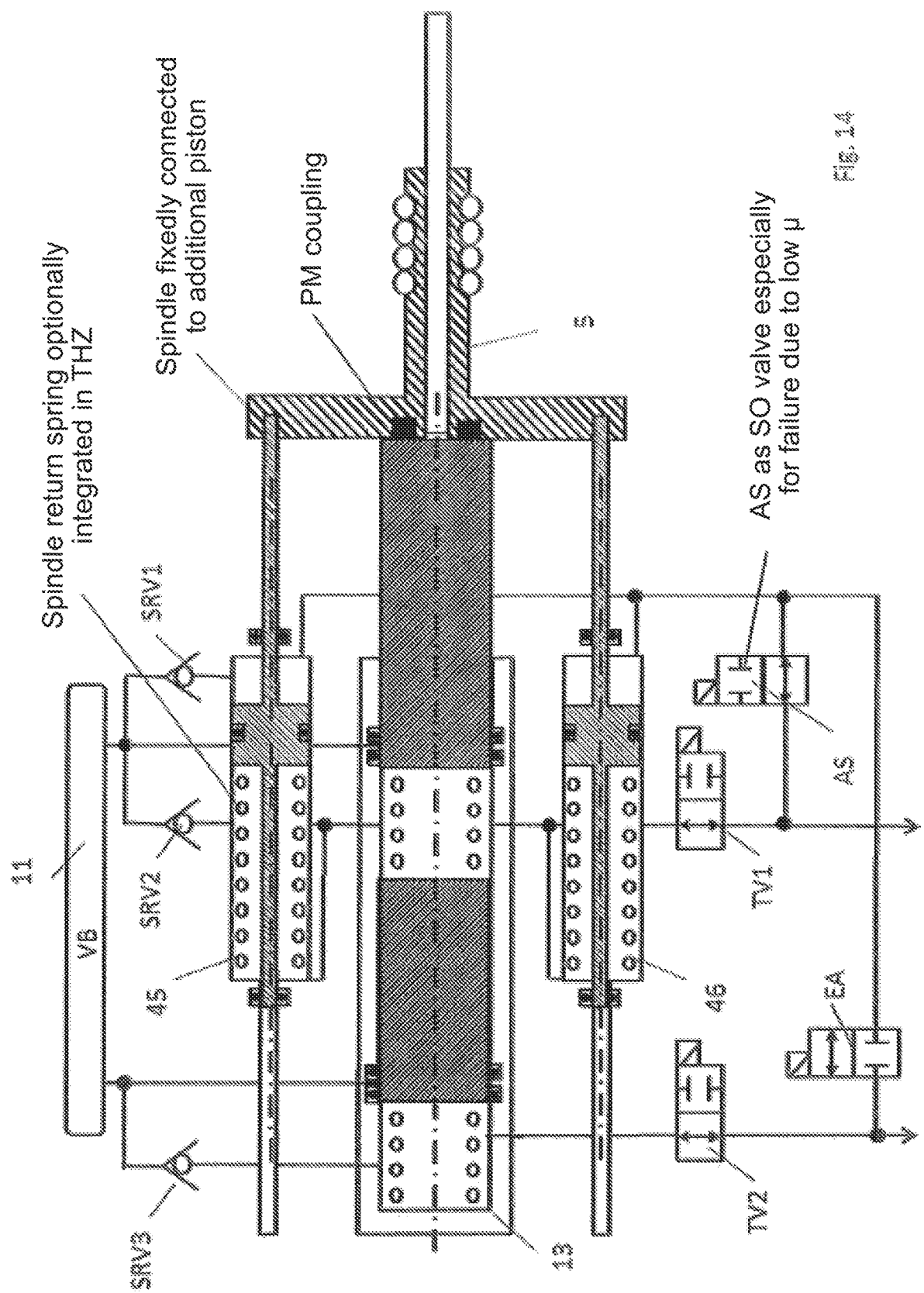

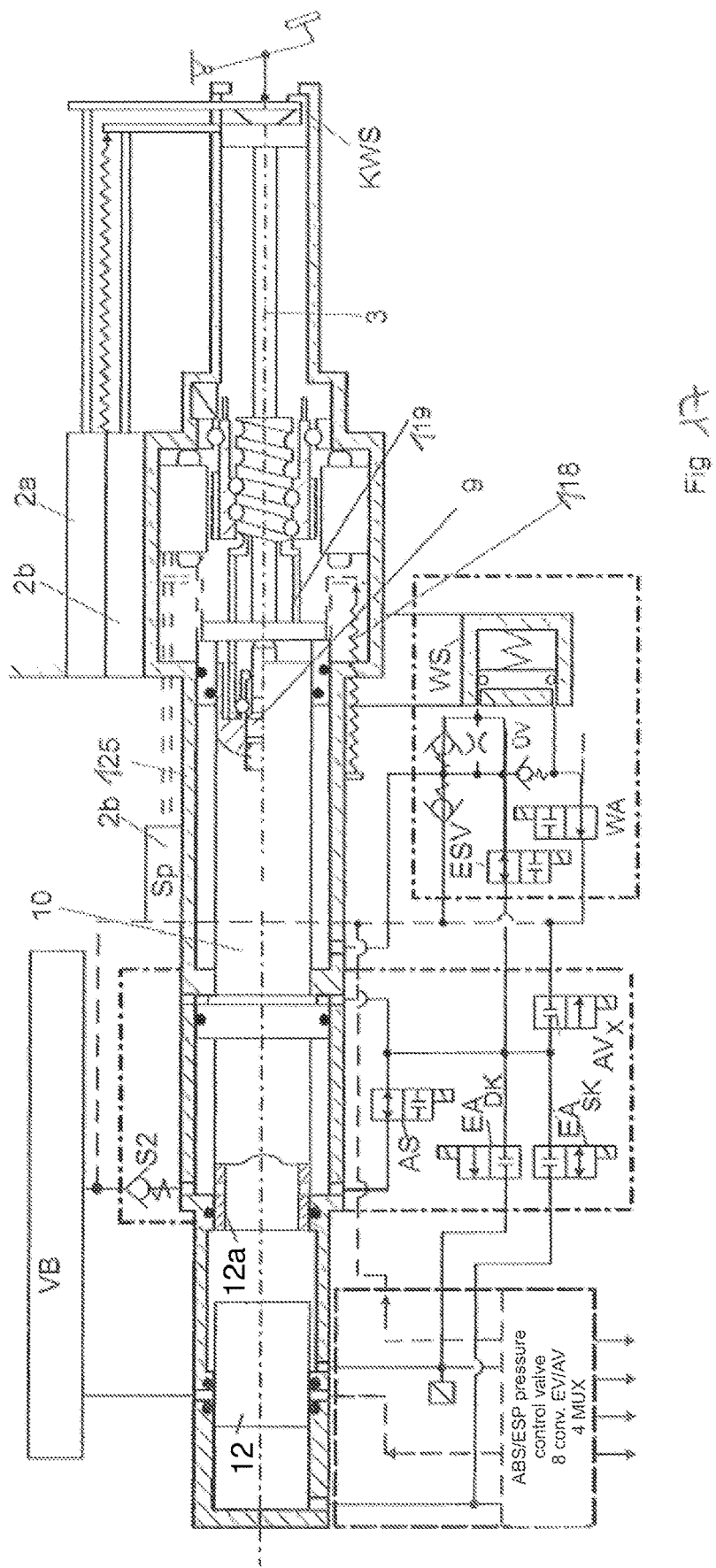

BRAKE DEVICE AND METHOD FOR OPERATING A BRAKE DEVICE

CROSS-REFERENCE TO RELATED APPLICATIONS

This application is a continuation of U.S. patent application Ser. No. 15/022,394, filed Mar. 16, 2016 as a Section 371 U.S. National Stage Filing of International Application No. PCT/EP2014/069650, filed Sep. 16, 2014, which was published in the German language on Mar. 19, 2015, under International Publication No. WO 2015/036601 A2, which claims priority to German Patent Application No. 10 2013 110 188.7, filed on Sep. 16, 2013, German Patent Application No. 10 2013 111 974.3, filed on Oct. 30, 2013, and German Patent Application No. 10 2014 102 536.9, filed on Feb. 26, 2014, the disclosures of all of which are incorporated by reference herein.

FIELD OF ENDEAVOR

The invention relates to a brake device or an actuation device and to a method for operating a brake device.

PRIOR ART

The requirements for brake systems are increasing. This also applies, in particular with regard to fail-safety and a good fallback level. If the brake force booster fails, then a deceleration that is, if possible, greater than 0.64 g should be achieved with the internationally predetermined foot force of 500 N which means notably more compared with the minimum requirement of the legislator of 0.24 g. An advantage of the long deceleration that can be achieved is also that a red warning light, which irritates the driver, does not have to be actuated.

This requirement can be resolved by brake-by-wire systems with travel simulator. In this connection, the main cylinder (HZ) or tandem main cylinder (THZ) is configured for the fallback level in the case of the brake system failing. This takes place through corresponding dimensioning with a small diameter. Greater pressures thereby result in the case of a corresponding foot force. The required volume for 0.64 g and corresponding pressure is relatively small in comparison to the maximum pressure in the case of complete vehicle deceleration and fading. A THZ cannot fully apply the required volume even in the case of a larger stroke. In DE 10 2007 062839 from the applicant, a solution therefor with a storage chamber is proposed, which injects corresponding volumes into the brake circuit in the case of higher pressures. Furthermore, in DE 10 2011 009059 from the applicant, a further solution is described, in which volume is delivered by the HZ from the reservoir into the brake circuit via correspond valve and HZ control. In the case of vehicles with large volume uptake, e.g. SUVs and small vans, the filling of the brake circuits must necessarily take place when braking even before the locking pressure for high p. Both solutions place a great demand on the leak-tightness of the valves. However, an interruption of the pressure build-up and low braking distance loss are linked for the additional filling of the brake circuits.

In DE 10 2011 111368 from the applicant, a system with additional pistons is described, which provide the required pressure medium volume and have the advantage of being actuated by the motor spindle and not being effective in the fallback level, i.e. they enable the predetermined deceleration. The correspondingly greater forces may disadvantageously have an effect here, as they burden the spindle, the ball screw drive (KGT) and the bearings.

OBJECT OF THE INVENTION

The object underlying the invention is to provide an improved actuation device, in particular for a vehicle brake system, which, in particular also in a simple manner, enables sufficient pressure fluid volume, in particular for brake activation.

Achievement of the Object

The achievement of the object according to the invention may be achieved with the features of as found in the various attached claims.

Advantages of the Invention

With the solution according to the invention and the configurations thereof, an actuation device, in particular for a vehicle brake, is provided, by means of which sufficient fluid volume is made available in particular for brake activation in a surprisingly simple manner. This can take place in a very advantageous manner without notable delay in the pressure build-up with warning of the fail-safety and possibility to diagnose the fault.

A basic concept of the invention is the formation of the driven piston of the piston cylinder unit, in particular as a stepped double stroke piston, which builds up the pressure in the piston cylinder unit or HZ/THZ in the part facing the pressure chamber as a conventional cylindrical piston as usual in the prestroke and in the return stroke, in particular operates as an annular piston and in particular similarly delivers volume into one or both brake circuits.

With the use according to the invention of a double stroke piston (as it is known per se e.g. from DE 10 2011 007672A1), volume can theoretically be delivered into the brake circuits with a high dynamic in an unlimited manner. In this regard, the switching of the piston movement by a dynamic motor is favoured such that this phase in the temporal pressure build-up means only one interruption of a few ms.

Further advantageous embodiments or configurations of the invention emerge from the features of the further claims to which reference is made here for descriptive purposes for the sake of simplicity.

The volume control expediently takes place via solenoid valves without the usual check valves.

These solenoid valves for volume control are safety-critical and can be fully diagnosed in operation. Additional variants of the valve control are also conceivable, as is described below.

Different valve connections for the ABS pressure control are also conceivable. In addition to the simple and advantageous pressure control via multiplexing methods (MUX), as is described further e.g. in EP 06724475 from the applicant, the conventional valve connection with inlet and outlet valves can also be used. The rest of the system design corresponds to the design described in DE 10 2013 105377 and DE 10 2010 045617 from the applicant.

The volume control can advantageously be used both for brake boosting (BKV) and also for ABS.

The solenoid valves (EA) can expediently also be used for additional functions, such as pressure reduction from the brake circuits without HZ piston movement for special functions such as for example in the case of recuperation or jamming spindle drive, amongst others.

A separation of the spindle from the driven piston is expedient for the full use of the fallback level. This can take place, e.g. by means of a coupling, as is described in EP 07819692 from the applicant. Reference is hereby made thereto.

Brake devices are regularly mounted on the bulkhead of the vehicle and protrude, on the one hand, into the foot space to connect with the brake pedal and on the other hand into the motor compartment. In the case of leakage from seals in the brake device, fluid can leak into both areas, which must be avoided.

An expedient embodiment of the brake actuation device thus makes provision so that leakage fluid cannot get through to the outside. In this connection, the housing, in particular the motor housing is enlarged and used as a collecting vessel. The escaping leakage fluid is detected in corresponding quantity by the level sensor of the reservoir. The sensor is advantageously connected to the adjacent ECU. Alternatively, an electrode can also be used in the collecting vessel, which detects even smaller fluid quantities at an early stage. In order to avoid sloshing of the fluid, corresponding separation chambers with a sponge can be used.

The structural length of the actuation device is crucial for future brake systems. In the case of integrated solutions, so-called "1-box concepts", a distinction is made between serial and parallel systems, wherein high requirements are placed on the fail-safety and controllability of the faults in the e.g. changed pedal characteristics in the fallback level. In the case of future vehicles, the friction of the brake shoes, which cause up to 300 W of power loss and thus $CO_2$, should be avoided.

A number of measures, e.g. increased rollback sealing in the brake piston, enable a low-friction brake. The free travel caused thereby for applying the brake shoes should be maintained as low as possible in its effect on the brake pedal.

Advantageous embodiments of the invention thus relate to an improved actuation device, in particular for providing a vehicle brake system which, in particular also in a simple manner, enables sufficient pressure fluid volume, in particular for brake activation. Moreover, the structural length should be as short as possible. The system should be usable in the packaging flexibly both for serial and parallel systems in the so-called compact design. For low-friction brakes with increased rollback, the pedal travel loss should be as low as possible.

As a result of the larger effective areas of the double stroke piston, in particular in the case of braking and high piston speed, a relative high flow quantity occurs, in the case of which negative pressure cannot occur on the rear side of the piston. Accordingly, suction valves are advantageously arranged for both piston sides.

A reduction of the structural length can be achieved by concentric arrangement of driven pistons and in particular double stroke pistons configured as annular pistons (as depicted by way of example in FIG. 10 of the drawing). Further possibilities consist of the arrangement of the floating piston parallel to the driven piston or double stroke piston (as depicted for example in FIG. 11 of the drawing) or of the arrangement of the double stroke piston parallel to the main cylinder, in particular with auxiliary pistons. A further variant consists of using the rear side of the driven piston similarly for volume delivery with corresponding valve connection and coupling to the spindle (as depicted for example in FIG. 13, 13a of the drawing).

The double stroke piston can, due to the larger piston effective areas thereof, be used for prefilling e.g. at the beginning of the braking via e.g. a pressure relief valve by conducting corresponding volume into the driven piston circuit by way of this excess pressure through the primary collar of the compression rod piston (driven piston). The volume required for applying the brake shoes thus does not have a significant effect on the pedal stroke and possibly has an effect corresponding to higher forces, which burden the spindle, the ball screw drive (KGT) and the bearings.

Further reductions of the structural length are possible according to the invention through the following measures. Shortening the piston stroke. Proceeding from a quick switch from prestroke to return stroke, sufficient volume with adequate dynamic is normally delivered via the double stroke piston into the brake system. To this end, a free travel between pedal plunger and piston plunger corresponding to the stroke of the travel simulator is determined, e.g. 16 mm. Due to the free travel, so-called hydraulic free travel clearance is not required in order to avoid a collision with the piston plunger taking place in the case of full control of the pedal plunger and travel simulator. The minimum piston stroke results from the maximum pedal stroke minus free travel, e.g. 36-16 mm=20 mm, which is sufficient for the above-mentioned volume delivery. In the case of the motor failing, the auxiliary piston delivers the required volume by injecting into the brake circuit in the fallback level.

A further reduction of the structural length is possible by enlargement of the floating piston and shorter stroke, whereby the same delivery volume is achieved.

With these embodiments or the configurations thereof, an actuation device, in particular for a vehicle brake, is provided, by means of which sufficient fluid volume is made available for brake activation in a surprisingly simple manner.

This can take place in a very advantageous manner without notable delay in the pressure build-up with warning of the fail-safety and possibility to diagnose the fault.

Further configurations of the invention include additional improvement options, in particular developed proceeding from a brake device according to DE 10 2013 111 974.3 from the applicant (to which reference is hereby made).

Travel simulator (WS) systems are connected with a fixed pedal force travel characteristic as is well known. The driver of present brake systems with ABS is, however, used to detecting a response of the vibrating pedal and fading by a longer pedal travel in the case of low µ even with a short pedal travel.

In the context of $CO_2$ reduction, a low-residual friction brake should be provided, which is possible by corresponding play. However, this results in a larger volume uptake and delay in the pressure build-up.

Structural length determines, amongst other things, the main cylinder piston stroke which is included several times in the structural length. More volume should still be available in the brake circuit through suitable measures in the case of shorter stroke.

In particular, the following advantages can be achieved with these advantageous configurations:

Prefilling (VF) by controlling the AS valve using pressure signal or motor current, of the piston stroke and the pedal speed. A lot of volume can thus be injected into the working chamber of the compression rod piston via the collar by way of the large effective piston area of the piston cylinder unit, in particular of the double stroke piston even in the case of short stroke. This advantageously takes place e.g. depending on the pedal speed $V_P$, since in the case of low $V_P$ a lower deceleration (pressure) is generally required compared to high $V_P$, which aim at full braking. In the case of low $V_P$, a VF pressure of 5 bar is, for example sufficient, in this regard play of the brakes is also advantageously covered. In the case of large $V_P$, a VF pressure of 30 bar is sufficient. In this connection, up to 50% more volume is generated with a relatively small main cylinder (HZ) stroke. The main cylinder stroke can thus be selected to be shorter, which is included in weight and structural length. Since the prefilling starts at the same time as the beginning of the stroke movement, no collar wear occurs due to the breather bore since, in this connection, the collar no longer slides over the breather bore of the compression rod piston. The prefilling has a larger volume in the brake circuit as a result which, in the case of withdrawing the brake pedal, disrupts the relation of $S_P$=f (p) via the travel simulator, in particular in the case of short pedal strokes. In addition, this would also result in a high load on the collar towards the end of the stroke. In order to avoid this, pressure reduction takes place in the case of large prefilling through the opening of the valve AV and volume outflow in the return flow to the reservoir (VB).

With the prefilling, a temporally quicker pressure build-up time to lock can also be achieved. The prefilling can also be used for extreme cases of failure of the motor e.g. due to low μ. The travel simulator stroke can be fully controlled in this case and the pressure in the brake circuit is very low. The remaining piston stroke in the fallback level is correspondingly lower with lower volume. The prefilling can also be used here until a pressure limit is reached, which delivers approximately 30% more volume or pressure.

In connection with the system having longer free travel and shorter main cylinder stroke, it is particularly advantageous to inject into the compression rod piston circuit via the piston cylinder unit, in particular double stroke piston, together with a special valve arrangement in the travel simulator with choke. This injecting (ES) is also advantageous in the fallback level in the case of motor failure in order to inject additional volume from the auxiliary circuit into the compression rod piston circuit.

The diagnosis of safety-relevant functions is also important. These include, amongst others, the function of the coupling and freedom of movement of the piston plunger, which are used in the case of a failed motor, if the pedal plunger directly shifts the compression rod piston to generate pressure.

The low-residual friction brake has a high potential for $CO_2$ reduction. As is well known, nowadays after braking, the brake pads without free movement generate additional friction which corresponds to 2-4 g $CO_2$/km. This can be improved by a strong rollback or by withdrawing the brake piston via negative pressure as is described in DE 10 2008 051 316.4 A1 from the applicant.

However, the air gap resulting in this connection is a problem, which means additional volume and time delay in the pressure build-up for applying the brake pads. An advantageous solution for this is prefilling and an adaptive air gap adjustment via negative pressure. Said play adjustment no longer has an effect in the fallback levels unlike rollback for example. The additional volume for the play is thus avoided such that a higher pressure level and improved pedal characteristics results.

Furthermore, in the case of the system with multiplex arrangement or operation (MUX), there is simultaneously $P_{auf}$ via return stroke in a brake circuit (BK) and $P_{ab}$ in the other BK by corresponding piston movement.

Advantageous exemplary embodiments as well as further advantages and features of the invention and the configurations thereof are depicted in the drawing and described in more detail below.

DESCRIPTION OF THE FIGURES

They show:
FIG. 4 a depiction of the double stroke piston;
FIG. 5 the temporal volume delivery in three stages;
FIG. 5a a summary concerning stage 1;
FIG. 5b a summary concerning stages 1 and 2;
FIG. 8 an alternative valve connection of the double stroke piston;
FIG. 9 a double stroke piston with an expansion for prefilling the brake circuits;
FIG. 9a a double shutoff valve;
FIG. 10 an embodiment with an annular piston;
FIG. 10a a double seal on the double stroke piston configured as an annular piston;
FIG. 10b a structural separation of annular piston and driven piston;
FIG. 11 the arrangement according to FIG. 1 with double stroke piston and floating piston in parallel or twin arrangement;
FIG. 12 the piston cylinder unit (THZ) with auxiliary piston and the actuator with double stroke piston as parallel system;
FIG. 13 another embodiment of the double stroke piston;
FIG. 13a an expansion of the embodiment depicted in FIG. 13 with a differential piston;
FIG. 14 a further embodiment with parallel piston capable of return stroke;
FIG. 17 an auxiliary piston in block B.

Figure 1:
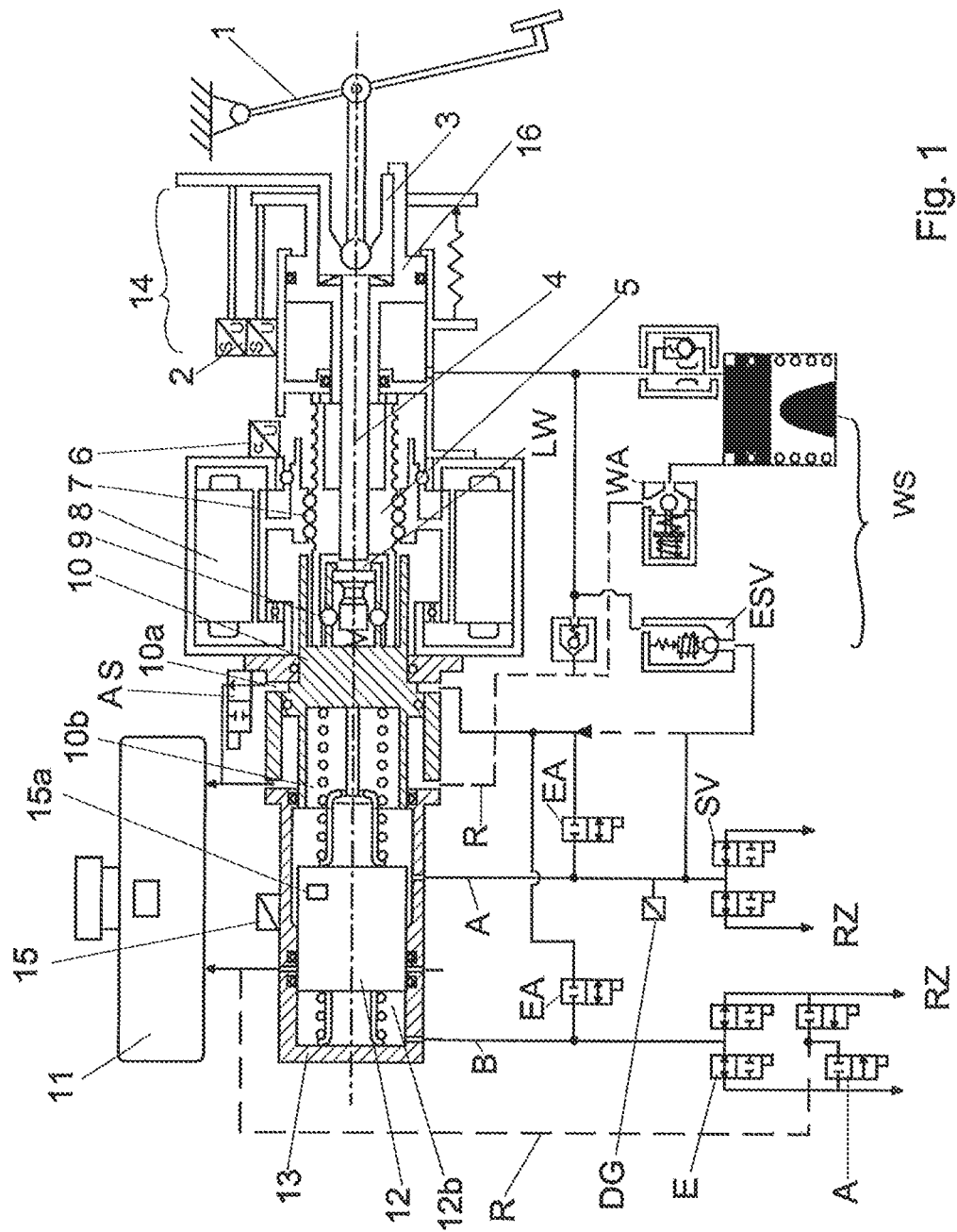
FIG. 1 a brake system with the double stroke piston according to the invention.

The brake system depicted in FIG. 1 is based, for example on the brake system depicted and described in DE 10 2013 105377 from the applicant to which reference is hereby made also for purposes of disclosure.

The brake system substantially consists of an actuation device, in particular a brake pedal 1, a pedal interface 14 with an auxiliary piston 16 and redundant pedal stroke sensors 2, a drive with a motor 8 and transmission, in particular a ball screw transmission 7 with a spindle 5, a piston cylinder unit actuatable by means of the drive, in particular the spindle 5, a tandem main cylinder (THZ) 13 with a directly driven double stroke piston 10, which rests on the spindle 5 and a directly, i.e. hydraulically driven floating piston 12. The double stroke piston 10 is configured in a stepped manner and forms an annular space 10a by means of the stepping. Between the drive, in particular the spindle 5 and the double stroke piston 10, a coupling 9 is arranged, which acts mechanically in this case and is mechanically actuatable. An example of a coupling of this type is described in EP 2217478A2 from the applicant to which reference is hereby made and is thus only schematically depicted in FIG. 1. A reservoir 11 is connected to the piston cylinder unit 13 via hydraulic lines and with the pressure chambers 10b, 12b of the piston cylinder unit 13 and via a normally open solenoid valve AS with the annular space 10a. The annular space 10a is also connected to the brake circuits A, B via hydraulic lines, in which the normally closed solenoid valves EA are connected. Furthermore, a travel simulator device WS and further valve device described in detail below as well as an electronic control or regulating device (ECU) (not depicted) are provided.

The brake pedal 1 acts on the auxiliary piston 16 arranged in the pedal interface 14. Said auxiliary piston acts on the pedal plunger 3 and the latter acts on the piston plunger 4. The pedal plunger 3 and the piston plunger 4 can be separated or connected to each other. An idle stroke or free travel LW is provided between the pedal plunger 3 and the double stroke piston 10. In the case of the example depicted in FIG. 1, the free travel LW is provided between the end of the piston plunger 4 and the coupling 9. In the case of the embodiment according to FIG. 6, the free travel LW is provided between the separately configured pedal plunger and the piston plunger. If long free travel corresponding to DE 10 2013 105377 from the applicant is not provided, in the case of the alternative with short free travel the free travel between piston plunger 4 and coupling is approximately zero, the coupling is thus moved with each braking. This has the advantage that a jam can be diagnosed.

The piston plunger 4 acts via the coupling 9 on the double stroke piston 10, which is configured in particular in a stepped manner and forms an annular space 10a. This annular space 10a is connected to the reservoir 11 and the brake circuits A, B via hydraulic lines.

The motor 8 is normally controlled via the pedal stroke sensors 2 and acts via the rotor, ball screw drive (KGT) 7 and the spindle 5 by way of a short play on the piston 10. This generates pressure in the brake circuit A, which acts via the floating piston 12 in the brake circuit B in a manner known per se. Preferably, the pistons are arranged in a tandem main cylinder (THZ) 13. Twin arrangements are also possible in the context of the invention.

Below, the pressure build-up $P_{auf}$ and pressure reduction $P_{ab}$ are firstly described for the normal brake function, then for the ABS function. The function of the travel simulator device WS is described in DE 10 2013 105377 from the applicant to which reference is hereby made.

In the case of the function of the pressure build-up $P_{auf}$, the double stroke piston 10 and floating piston 12 come into the region of the stroke end, which is detected in the double stroke piston by the motor sensor 6 via the rotor revolution and spindle pitch (stroke). The movement (position) of the floating piston 12 can be assessed from the spindle stroke and the pressure determined by a pressure sensor DG provided in the brake circuit A using the known assessment of the pressure-volume characteristic curve. If the stroke end is now reached, the motor 8 and the spindle 5 are switched from prestroke to return stroke. In this connection, the normally open valve AS arranged in hydraulic line to the reservoir 11 is closed and one or both of the normally closed valves EA arranged in hydraulic lines to the brake circuits A, B is open. The spindle 5 now moves the double stroke piston 10 back via the closed coupling 9 and the volume from the annular piston space 10a now reaches into the brake circuits A and B via the EA. This can take place simultaneously or serially. If the end of the return stroke is now reached, then the prestroke takes place again with the closing of the valves EA and opening of the valve AS.

The return stroke depends, in this regard, on the position of the pedal 1 or the pedal plunger. In the case of full control of the travel simulator WS, the return stroke can be approximately 60% of the prestroke, which, however, delivers sufficient volume. In the case of a normal vehicle, the return stroke is required only in the fading region, in the case of small commercial vehicles it can even take place with 50% braking.

Borderline cases are conceivable, in which the additional volume delivery via the return stroke starts earlier, e.g. in the case of a small leakage or vapour bubble formation. It is advantageous in this method for the volume delivery to be able to take place in a highly dynamic manner and without notable time delay theoretically only limited by the supply in the reservoir 11. This in the case of relatively small piston dimensions and corresponding spindle forces.

Valve Connections:

The ABS regulation can take place in the preferred and often described manner by valves SV in the multiplex (MUX) method, wherein only one valve SV is in each case provided per wheel brake RZ (not depicted), as this is depicted in FIG. 1 for the brake circuit A. By way of the possibility of continuous volume delivery, the conventional method of pressure control can also take place via inlet valves E and outlet valves A (one valve E and A each per wheel brake RZ), as this is depicted in FIG. 1 with regard to the brake circuit B. The volume required for the pressure reduction $P_{ab}$ which is conveyed via the return flow line R into the reservoir, can be supplemented by the volume delivery of the piston 10.

The E or A valves still have additional functions. In the case of regulation due to low μ, the piston 10 must be moved very far back, which would lead to a collision with the pedal/piston plunger. In order to avoid this, an opening of the EA valve and pressure reduction from the brake circuit can expediently take place, as this is described in DE 10 2010 045617 from the applicant (so-called HLF). The volume from the brake circuit A or additionally B can be conveyed for the pressure reduction into the reservoir 11 via the piston 10 or the associated pressure chamber and the valve AS.

Alternatively, a free travel LW can be provided between pedal and piston plunger, as is described in detail e.g. in DE 10 2013 105377 from the applicant. A further borderline case is conceivable by locked motor or spindle. The vehicle remains braked in this case. In this connection, the pressure can be released via the E/A valves.

In the fallback level (RFE), the coupling between the spindle 5 and the piston 10 is expediently separated, i.e. the coupling is open, since otherwise the RFE effect is reduced by the additional force to overcome residual torque and spindle return spring, which accounts for approximately 15% such that the 0.64 g cannot be reached. The piston plunger thus separates the coupling 9 in the RFE and acts directly on the double stroke piston 10. If, e.g. for reasons of cost the coupling is left out, a corresponding reduction of the efficiency results. It is also conceivable to make the piston of the piston cylinder unit (THZ) 13 smaller in diameter since the quick supply allows this and sufficient pressure medium volume is provided in the fallback level via injecting.

In order to improve the pedal travel in the fallback level, as described in DE 10 2013 105377 from the applicant, volume from the pressure chamber of the auxiliary piston 16 can be conveyed via the valve ESV into the brake circuits. This can take place in this case e.g. via the valve ESV into the brake circuit A. Alternatively, pressure medium can be conveyed via the valve ESV on the rear side of the piston 10 (corresponding to the line marked in a dashed manner in FIG. 6). This has the advantage that a brake circuit failure does not occur in the case of a leakage of the valve ESV. In addition, depending on the position of the pistons 10, 12, pressure medium volume can also be injected via the valves EA into the brake circuits. This injecting is particularly advantageous for a solution with idle stroke, as is described in DE 10 2013 105377 from the applicant. The impinging of the pedal plunger on the double stroke piston 10 can be detected via the pedal travel sensor 2.

Figure 2:
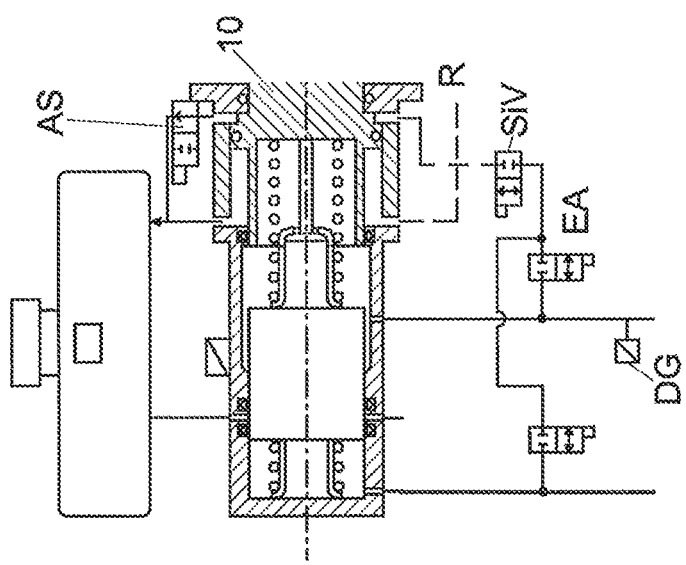
FIG. 2 a section of the brake system with double stroke piston with valve connection.

FIG. 2 shows an additional, normally closed safety valve SiV in the line from the annular space 10a of the double stroke piston 10 to the valves EA. Unsealed EA valves result in a brake circuit failure since the leakage volume reaches into the reservoir 11 via the double stroke piston 10. This impedes the redundant SiV in the line to the reservoir 11 via the valve AS. The valve AS can also be configured redundantly by parallel connection of a second valve. It is thus ensured that a pressure build-up is possible even in the case of a valve failing.

Figure 3:
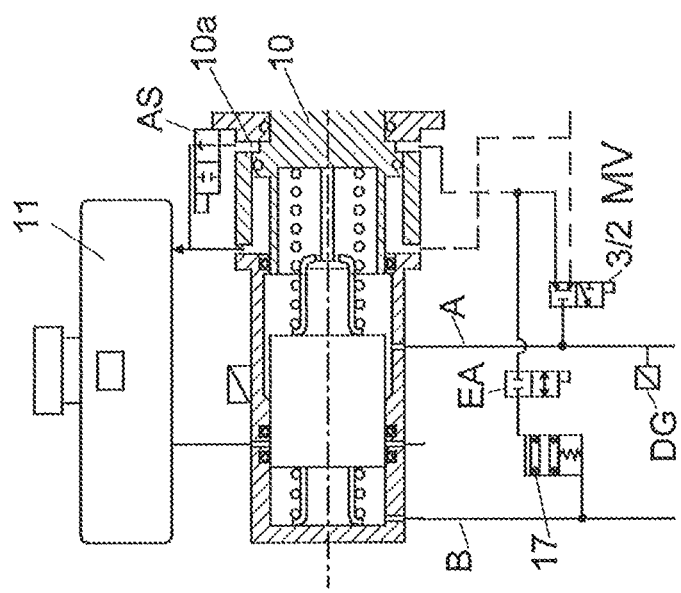
FIG. 3 a section of the brake system with an alternative valve connection.

FIG. 3 shows a simplified valve connection for the control of the double stroke piston 10. Instead of the valves EA and AS, a 3/2 way solenoid valve MV can be used for each brake circuit A, B, which saves the valve AS because the annular space 10a of the valve 10 is connected via the 3/2 solenoid valve to the reservoir in the outlet position. In the connected state, this connection is closed and the annular space 10a is connected to the brake circuit A or B via the 3/2 solenoid valve. This is only depicted for a brake circuit A in the figure since an alternative embodiment is shown for the others. One 3/2 solenoid valve would then also be used for the brake circuit B. An SiV (not shown) can also still be used here in addition in the line. For brake circuit B, the opening of the brake circuit B can be avoided by a plunger 17 together with the EA valve.

FIG. 4 shows the stepped double stroke piston 10 with the annular space 10a and the different effective areas A1-A3 thereof in an enlarged manner. The volume for the prestroke is determined from volume $V_V = A_1 \times$piston stroke, the following applies for return stroke $V_R = (A_2 - A_3 - A_1) \times$piston stroke. Preferably, $V_R$ is selected so as to be smaller, a smaller piston force=motor torque is thus required for the higher pressure range if only one return stroke is required.

In the case of two prestrokes, the same effect can optionally be achieved by one idle stroke for the prestroke by the prestroke delivering into the reservoir 11 in the case of a closed valve SV.

FIG. 5 shows the temporal volume delivery in three stages via the two-fold prestroke VH and one return stroke RH. The switch time from prestroke VH to return stroke RH requires one only very small time delay of <10 ms.

FIG. 5a shows only one stage, which is used in the case of over 90% of braking operations. This phase can also be used for diagnosing the leak-tightness of the valves EA and AS. A leak from EA can be determined by two methods. Firstly by comparing pressure and piston travel and assessing the pressure-volume characteristic curve. In the case of a leak, the known association of pressure and volume (or piston travel) would be disrupted. Secondly, the pressure can be maintained by corresponding piston position in the case of pressure reduction $P_{ab}$ for x and assessed via $t_D$. In the case of both tests, all leakages are detected in the brake circuits. When the SiV according to FIG. 2 is used, the valves EA can be tested separately by closing SiV.

FIG. 5b shows the volume delivery in two stages. When the brake pedal from stage 2 is withdrawn, the corresponding pressure is reduced by opening the valve EA, controlled via the pressure sensor DG. The DHK piston 10 or floating piston 12 is thus prevented from moving with too much pressure over the breather bore in the main cylinder. The pressure is only reduced so much such that in stage 1 the normal association of pressure to piston travel occurs, such that optionally only low pressure is used to move over the collar.

With the double stroke piston and the control possibilities described, a quick and continuous volume change is possible with relatively little effort which increases the application and acceptance of the system and is at the same time fail-safe.

Figure 6:
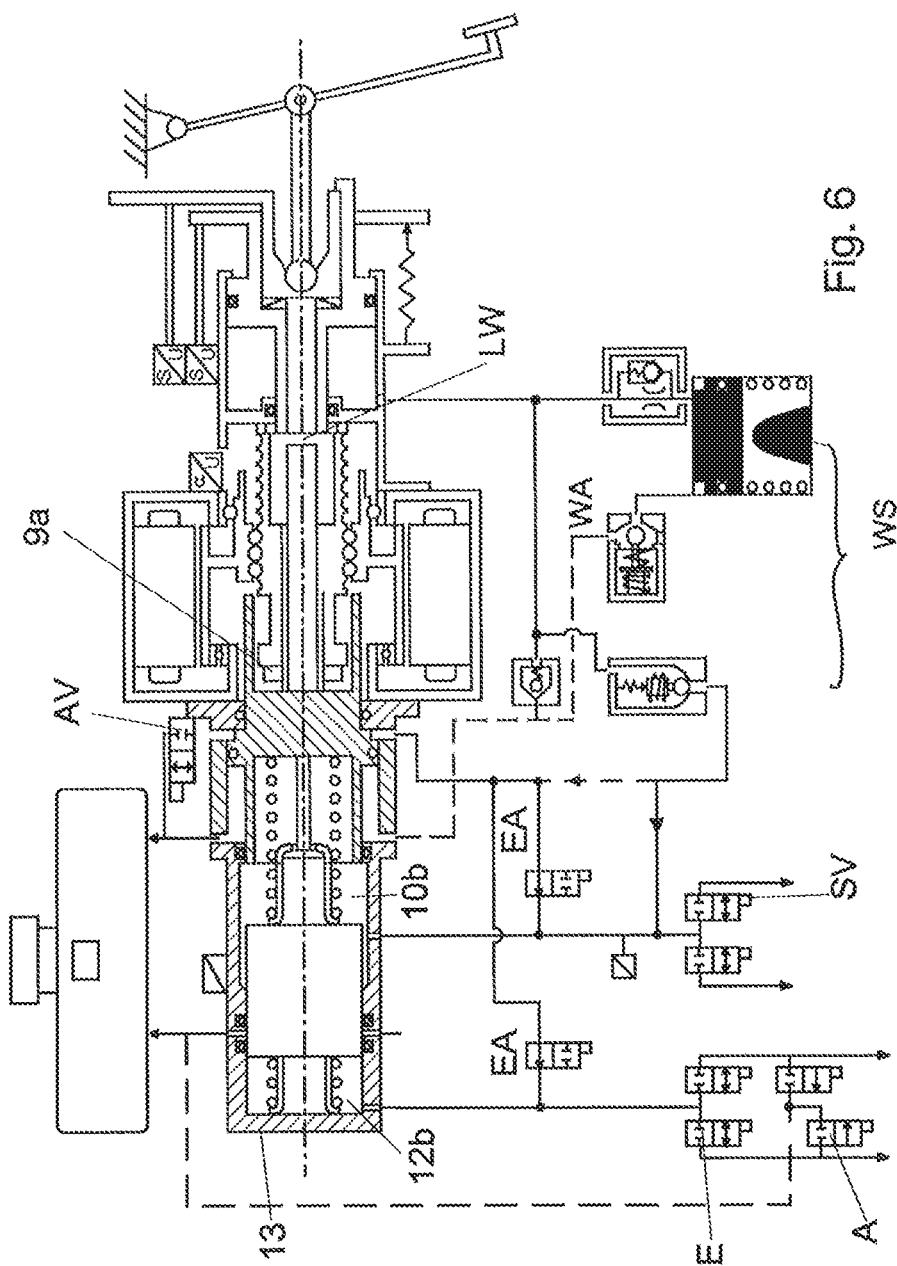
FIG. 6 a different embodiment of a brake system with a double stroke piston according to the invention.

In FIG. 6, a different embodiment of the brake system according to the invention is depicted with a magnetic coupling 9a and a free travel LW between pedal plunger 3 and piston plunger 4, which corresponds to the control path of the travel simulator. In the case of this embodiment, the volume supply takes place with a modified valve connection. In this connection, in the case of the return stroke delivery is not carried out into the brake circuit via fully or partially opened valves SV or valves E, but rather into the pressure chambers 10b, 12b of the piston cylinder unit (THZ) 13. In this regard, all valves SV and E are closed. It is advantageous here to use a simple magnetic coupling, as is described in DE 10 2010 044754 from the applicant to which reference is hereby made also for the purposes of disclosure. This is possible with this embodiment because a comparatively low piston force is sufficient to deliver the fluid volume from the annular space 10a of the double stroke piston 10 via the valves EA into the working chambers of the main cylinder which are associated with the brake circuits A, B. In this connection, the delivery volume of the return delivery must match the uptake volume of the main cylinder circuits by corresponding dimensioning. The valve switch position in the case of the return stroke end is depicted in FIG. 6, i.e. valve EA open and valve SV or valve E to the wheel brake cylinder are closed. Furthermore, lower bearing forces in the drive result in the case of the return stroke. However, this embodiment can lead to a small time delay in the case of pressure build-up compared with the suction via negative pressure. Otherwise the valve connection according to FIG. 2 and the 3/2 way valve according to FIG. 3 can be used for this embodiment.

Figure 6A:
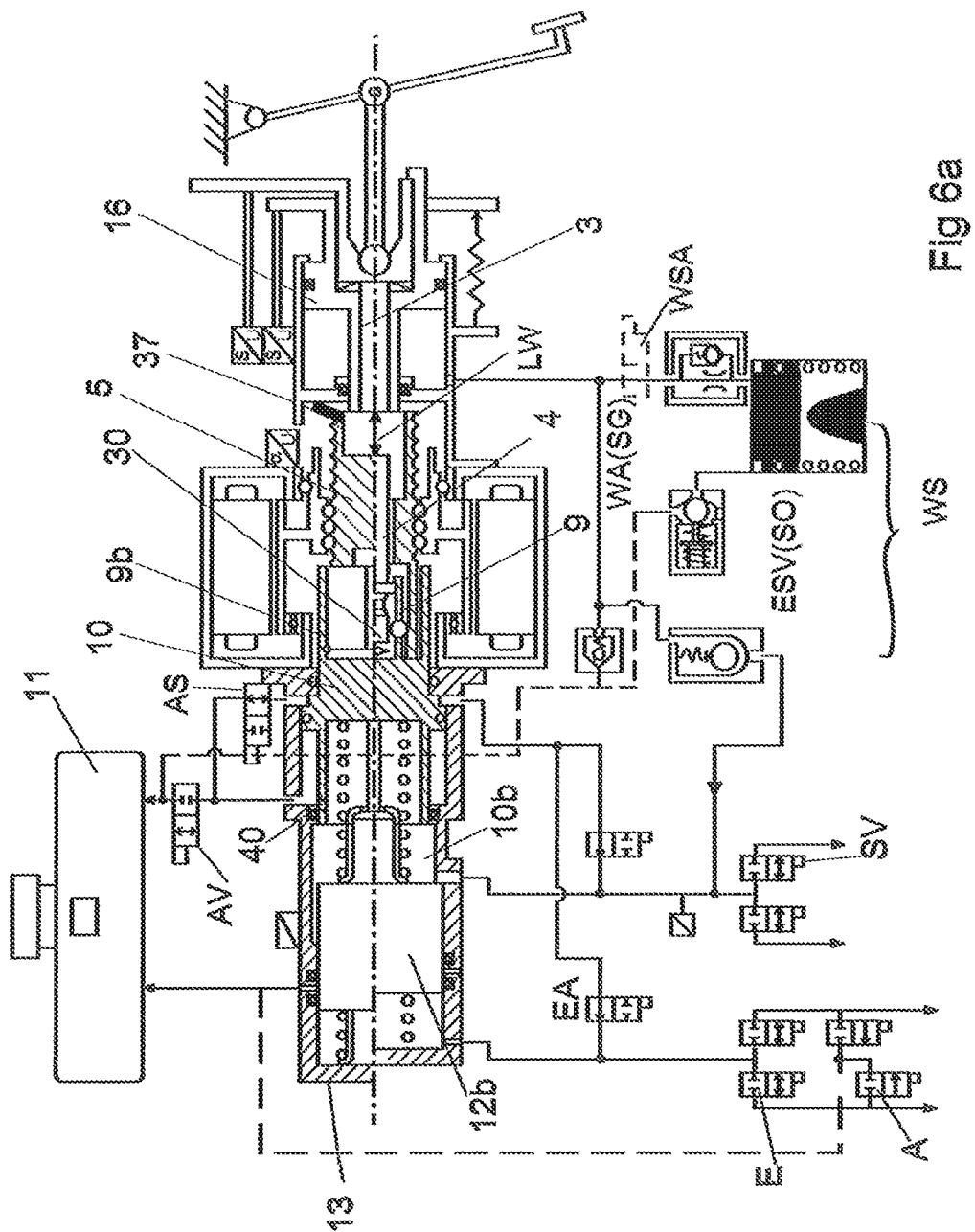
FIG. 6a an embodiment with idle stroke and injection from an auxiliary piston, wherein in the upper half of the figure the spindle of the drive is connected to the piston by means of a connection element, in particular a bending rod and by means of a coupling in the lower half.

FIG. 6a shows an embodiment similar to FIG. 6 wherein in the upper half of the figure, the spindle of the drive is connected to the piston by means of a connection element, in particular a bending rod and in the lower half by means of an, in particular mechanical coupling. Unlike FIG. 6, the volume of the auxiliary piston 16 here is, however, not directed to the rear side of the double stroke piston 10, but rather is directed in the fallback level RFE in the case of the vehicle electrical system or the ECU failing via a normally open valve ESV, with a normally closed valve WA, into the brake circuit. Since the breather bore at 40 of the compression rod piston circuit is open in the outlet position of the double stroke piston 10, a shutoff valve AV to the reservoir 11 is used, which is closed at the beginning of braking. Thus no volume can flow into the reservoir 11 in the fallback level. The shutoff valve AV can be economised if the motor is driven back against the stop spring prior to the beginning of braking in order to open the breather bore. The situation in which the breather bore is closed persists even in the case of greater pressures or pedal travels such that in the case of the pedal plunger 3 impinging on the piston plunger 4, both surfaces of the auxiliary piston 16 and of the driven piston 10 deliver volume. In this case a higher pedal force results, which is comparable with conventional systems. However, if the ECU is intact, then the injection is controlled, as described via ESV and WA, until a certain pressure is reached. The volume uptake of the travel simulator WS is disrupted somewhat in the fallback level by the initially flatter course of the pedal force via the pedal travel. This can be eliminated by an additional normally closed shutoff valve WSA.

This solution provides an additional possibility for structural length reduction by the stroke of the double stroke piston DHK 10 being equal to the difference of pedal stroke and free travel, e.g. 36 mm–16 mm=20 mm, corresponding to the control travel of the travel simulator WS, which means a structural length reduction of 48 mm. This is possible since pressure is continuously built up via the double stroke piston 10. The spindle length is thus also reduced and the expensive bore in the spindle 5 can be dispensed with. In this connection, the spindle can be connected to the double stroke piston DHK 10 via a bending rod (as depicted in FIG. 12). However, in this case the spindle with motor has to be moved in the fallback level RFE, which requires approximately 5% more power if the pedal plunger impinges the rear side of the spindle. Alternatively, the mechanical coupling 9 from FIG. 1 can also be used. The above-mentioned additional force is thus not required in the fallback level RFE with ECU function in the case of the motor failing. A further possibility of the structural length reduction is a greater diameter and shorter stroke of the floating piston 12. This applies for all solutions.

Figure 7:
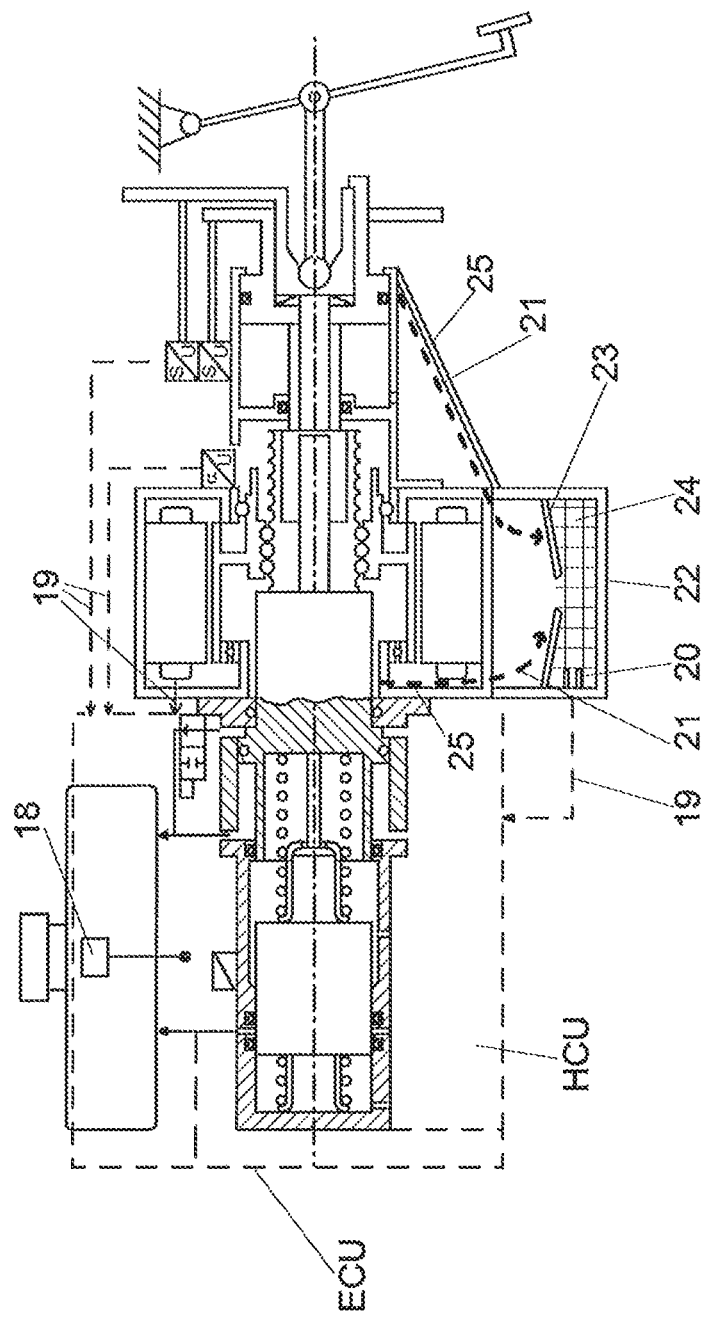
FIG. 7 an embodiment with a device for avoiding the escape of leakage fluid to the outside.

FIG. 7 shows an embodiment with a means for preventing the escape of leakage fluid to the outside. Seals in hydraulic systems tend to leak under unfavourable conditions. Double seals are often used which reduce the probability of leakages, but do not exclude them. However, seals of this type produce disadvantageous higher friction. Seals which affect the footwell and also power units or the motor compartment are affected. As a solution, a corresponding housing, advantageously an extended motor or motor connection housing 21, 22 is used which comprises both outlet channels 25 and an uptake volume for the leakage flow. A separation chamber 23 with a sponge 24 is expediently provided in the lower region of 22 in order to prevent sloshing of the fluid in particular in the case of the vehicle accelerating and decelerating.

The corresponding leakage flow is detected by a level sensor 18. In this connection, it is also advantageous to combine the level sensor with the adjacent ECU. In this regard, sensors with high fail-safety can also be used. Alternatively, electrodes 20 can also be used which are arranged in the lower region of the collecting vessel and are connected to the ECU by means of an electrical line. With said electrodes, even very small fluid leakage quantities can be detected. For complete integration, the HCU, which comprises the solenoid valves and the pressure sensors, is integrated. This means that a so-called 1-box solution is achieved, which comprises a full integration of all components in one unit.

The embodiments according to FIGS. 8 and 9 build on those of FIG. 4 such that only the changes are described in the following description. Large flow rates occur by way of the relatively large effective areas of the double stroke piston 10 with quick piston actuation, in the case of which negative pressure cannot occur on the suction side of the piston. For this reason, suction valves S1 and S2 are arranged for both movement directions (prestroke and return stroke). For the case that the delivery quantities for prestroke are >return stroke, the surplus volume can be channelled off via a screen. The prestroke speed is greater in the borderline case than the return stroke speed. The volume in the prestroke is thus directed via the suction valve S1 to the rear side of the double stroke piston 10; the open solenoid valve AS acts as a suction valve. In the case of the return stroke, the lower flow rate quantity is directed through the solenoid valve AS and S2 acts as a suction valve. In the case of the volume delivery in the brake circuit, e.g. driven piston 10, the solenoid valve AS is closed and the solenoid valve EA is open, as already described.

FIG. 9 shows a slightly changed arrangement of the solenoid valve AS and the suction valve. The volume is directed in this case through the solenoid valve AS in the prestroke. This version shows the expansion of the driven piston 10 for prefilling the brake circuit in order to reduce the free travel on the pedal. In the prestroke, a pressure relief valve Ü operates, e.g. 4 bar such that corresponding volume reaches into the driven piston circuit via the primary collar or driven piston collar 10 and more volume is thus provided. Since this admission pressure is used only at the beginning of braking, the pressure relief valve Ü is opened via a plunger 33 after prefilling (VF). Different control possibilities are conceivable in this case, e.g. that the prefilling (VF) operates again for the fallback level in the case of the E-motor failing at low μ, i. e. pressure 0 in the driven piston circuit, which does not change anything on the principle of the volume supply by the double stroke piston 10.

FIG. 9a shows a double valve arrangement with two shutoff valves AS1 and AS2 which are installed instead of the valve AS provided in FIG. 9. The shutoff valves AS1 and AS2 are connected such that the current direction and current force act against the spring FAs. The current force is thus prevented from being greater than the spring force and the valve closing.

FIG. 10 shows the basic structure of an actuation device with auxiliary piston 16, spindle 5 and coupling 9, in which the driven piston and the double stroke piston 12 configured as an annular piston 28 are combined. The delivery chamber of the double stroke piston 28 is in this connection formed by an annular space 40 arranged concentrically to the pressure chamber of the driven piston, in which the annular piston 28 with seal collar 28a is arranged. The driven piston also draws in air via the delivery chamber of the double stroke piston as depicted for 41. The valve arrangement corresponds to that of FIG. 9. The different possibilities of the pressure modulation via inlet valves EV and outlet valves AV or multiplex operation (MUX) via solenoid valves SV are also depicted here. In the first case, the solenoid valve EA can be replaced with a simpler check valve RS since the pressure reduction, e.g. for the hydraulic free travel clearance can take place via corresponding outlet valves AV.

FIG. 10a shows the sealing of the annular piston 28 by the collar 28a which slides in the annular bore or annular space 40, the inner diameter of which is secured via the seal 34. A further seal 35 is required for the rear side of the annular piston which acts as the primary seal as in the case of the main cylinder. As in the main cylinder, an additional secondary seal 35a can also be used here, wherein the sealed chamber is connected to the reservoir 3. This arrangement can also be used in FIG. 1.

FIG. 10b shows a divided embodiment of annular piston 28 and driven piston 31 which are connected via a securing ring 32 in a non-positive manner. This embodiment is less tolerance-sensitive.

FIG. 11 shows an arrangement also with structural length reduction by the piston cylinder unit being configured in a twin arrangement by using the floating piston 12 as the twin. The valve connection of the valves AS, S2 and S3 and the screen 26b is taken from FIG. 9. For the case of a double fault of the motor and thus failure of the double stroke piston 10 and brake circuit failure, pressure is no longer applied to the floating piston 12. In the case of an intact motor, the floating piston 12 would be operated via the double stroke piston 10 in the return stroke if the brake circuit failed and the inlet valves EV in the driven piston circuit would be closed. In the case of a double fault, the floating piston 12 is fed by the auxiliary piston 16 via the ESV and closed isolation valve TV1.

FIG. 12 shows a parallel arrangement of tandem main cylinder THZ with the pistons 12 and 12a and pressure modulation device consisting of motor 8, transmission and double stroke piston 10. In this connection, the connection to the brake pedal with the pedal plunger is omitted in comparison to FIG. 1. The valve arrangement for pressure modulation and travel simulator WS is the same as in the preceding figures. Since the connection to the pedal plunger is no longer present here, a bending rod 30 is used instead of the bending tube and coupling, so that the spindle eccentricity does not cause large transverse forces on the double stroke piston 10. The unit located parallel consisting of tandem main cylinder THZ with the floating piston 12, driven piston 10 and auxiliary piston 16 was already described in DE 10 2010 050133 from the applicant (to which reference is hereby made in this regard) which requires the travel simulator circuit with auxiliary piston, which is independent of the driven piston circuit, which has significant advantages in terms of fail-safety. In addition, the travel simulator WS can only be configured in a two-stage manner, which saves costs and volume. In the first flat area, the return spring acts as the 1st stage of the travel simulator WS, the WA valve is open in this regard.

The travel simulator WS acts only in the second stage with progressive increase in force after the closing of the valve WA. In comparison to DE 10 2010 050133 from the applicant, an improvement for the fallback level is integrated here by using a changeover valve UV. This connects the auxiliary piston 16 to the rear side of the piston 12a in a currentless manner. Thus in the case of the ECU or the motor failing, the free travel LW required for e.g. recuperation does not lead to pedal failure, the volume of the auxiliary piston 16 is directed in this case to the rear side of the piston 12a. In the case of an intact ECU, the volume of the auxiliary piston 16 can also be injected into the brake circuit via ECU e.g. in the case of the motor failing.

The diagnosis of the travel simulator with auxiliary piston and main cylinder (THZ) can take place by pressure generation in the brake circuits. In the case of the valve ESV opening, pressure medium can reach in the auxiliary piston circuit when the valve EA is closed. In the case of the normally open valve UV opening, pressure medium reaches in the elastic pressure medium chamber of the auxiliary piston 16 which can be measured at the piston stroke of the double stroke piston. By using the normally open 2/2 solenoid valve (not depicted) in the line of the auxiliary piston to the piston 12 and a normally closed 2/2 solenoid valve in the line of the auxiliary piston to the valve ESV, the diagnosis can be expanded by also applying pressure medium to the piston and it correspondingly moving.

The piston cylinder unit (THZ) is separated from the pressure supply via isolation valves TV2, TV3 in the case of an intact motor and ECU, similar to the EHB or parallel systems as shown in DE 102010 040097. The advantage of the arrangement shown is the higher fail-safety and continuous volume delivery. The piston cylinder unit (THZ) from DE 102010 040097 or DE 102011 081601 can also be combined with the pressure supply dispensing with the fail-safety in the case of the travel simulator.

Unlike DE 102010 040097, there is no pressure sensor used here since the most important parameters for diagnosis and function can be detected by motor current and piston travel.

In order to reduce the structural length, the (twin) solution according to FIG. 11 can also be used here.

FIG. 13 shows, proceeding from the depiction according to FIG. 6a, another embodiment of the double stroke piston 10. The double stroke piston 10 is neither stepped nor configured as an annular piston, but rather it corresponds in structure and sealing with primary and secondary collar to a conventional compression rod piston. In this case, it is coupled to the spindle 5 via the piston plunger 4. A free travel LW is integrated therein, as in the case of the embodiment according to FIG. 6a. The rear side of the double stroke piston 10 is connected via a shutoff valve AS to the reservoir (VB) 11. If further volume is now required, the return stroke of the double stroke piston 10 then takes place in the case of the closed valve AS and at the same time the isolation valves TV2 and TV3 to the piston cylinder unit (tandem main cylinder THZ) are closed. In the case of the return stroke, volume is delivered via the check valve RS and the valve EA or alternatively via two valves EA into the brake circuits. At the same time, volume from the reservoir 11 is suctioned via suction valves S1 and S2 installed in the hydraulic lines leading to the reservoir 11 by the floating pistons 12 or 12b and the double stroke piston 10, said reservoir being available for further pressure build-up in the case of the next prestroke. An advantage of this construction consists of the shorter structural length and a simpler double stroke piston 10, which is, however, connected to more valves.

The solution according to FIG. 13a builds on an arrangement as is described e.g. in the PCT/EP 2007/009683 from the applicant and is expanded with a double stroke piston. The inner piston 10 here corresponds to the driven piston with breather bore 40 and the outer differential piston 38 corresponds to the double stroke piston. The driven piston is, as usual, sealed by means of primary collar and secondary collar 27 and the differential piston via the seals 39, 35 and 34a. The valve connection of the double stroke piston with valve AS, valve RS etc. corresponds to that depicted in FIG. 13, supplemented by a suction valve (S2). This is required in order to suction the volume in the case of the closed valve AS back into the piston after the return stroke with volume delivery in the case of the subsequent prestroke. The arrangement has connection lines to the reservoir VB. The differential piston is connected to the ball screw transmission 7 via the spindle 7 and the driven piston is connected to the pedal plunger via the piston plunger 4. Since the spindle 5 acts on the differential piston for pressure modulation and the driven piston acts only in the fallback level, a coupling is no longer required. This solution can be combined with integrated free travel or with hydraulic free travel clearance via at least one inlet/outlet valve EA.

A further advantageous embodiment is depicted in FIG. 14. In this embodiment, in particular two parallel pistons are arranged parallel to the piston cylinder unit (THZ), which are fixedly connected to the spindle. The return stroke of the spindle thus acts directly on these pistons for volume delivery. In this connection, a valve arrangement according to FIG. 9 or also FIG. 13 can be used. With this embodiment, which can also be operated in the multiplex method, the volume currents can be reduced, amongst other things, in the case of short structural length.

Figures 15, 15A:
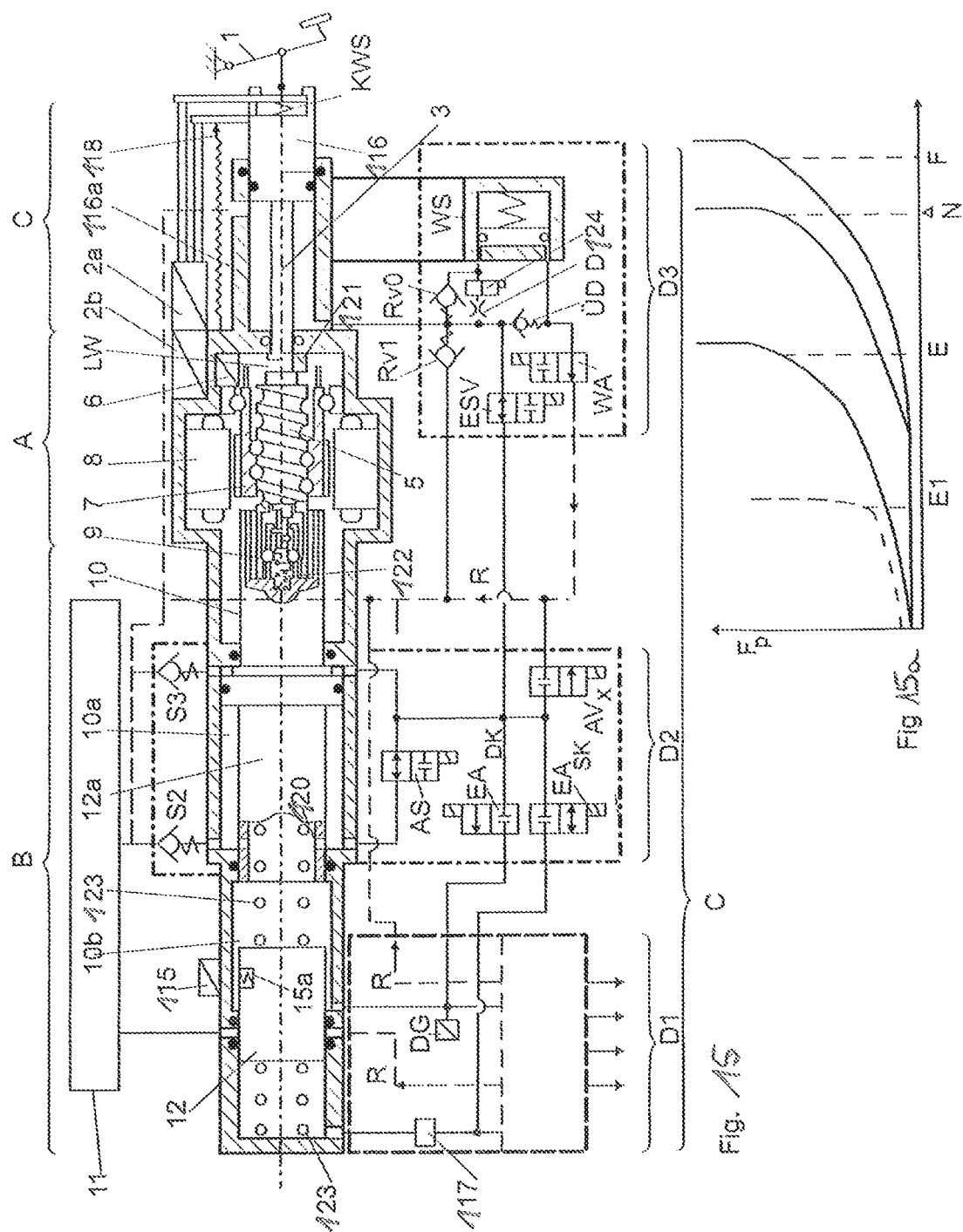
FIG. 15 an entire system with structuring of the functional blocks.
FIG. 15a an adaptive travel simulator (WS)
Figure 16:
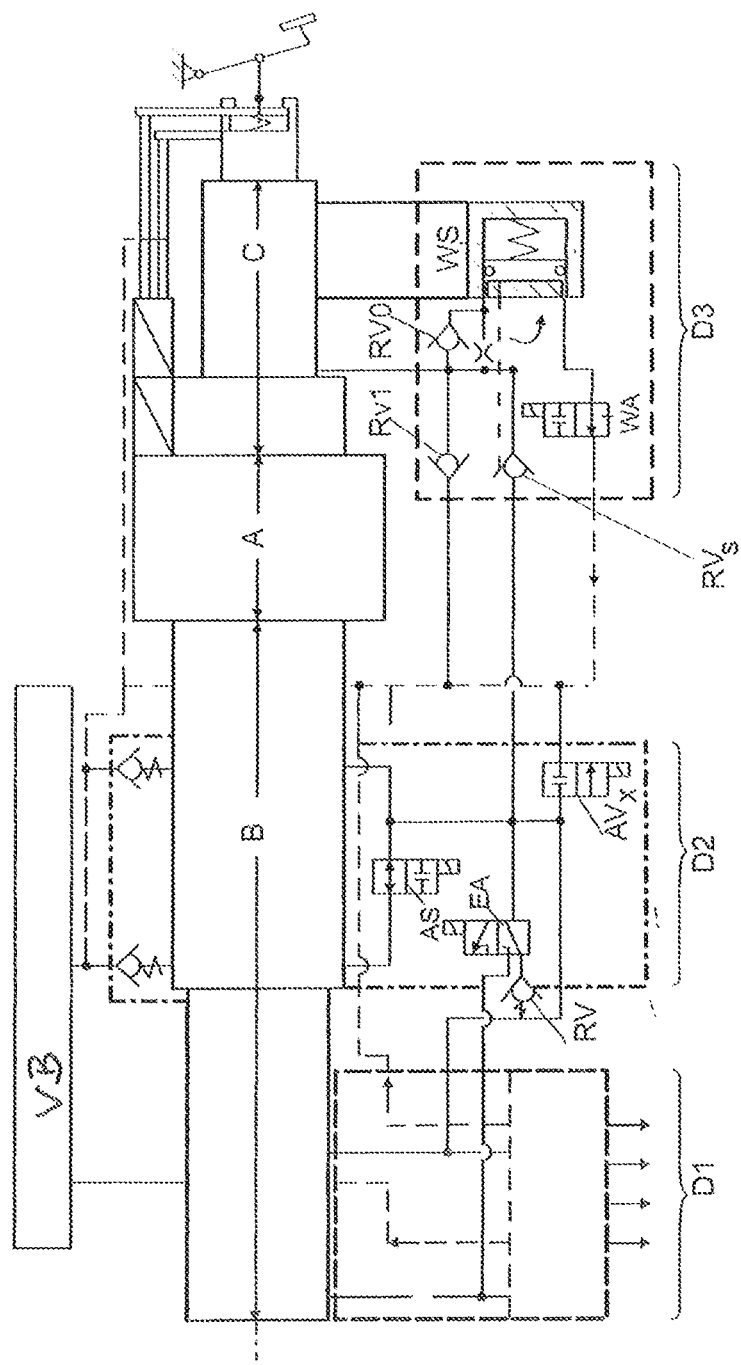
FIG. 16 Valve connections.

Reference is then made to FIGS. 15 to 17. The entire structure of the embodiment depicted in FIG. 15 largely corresponds to the embodiment depicted in the preceding figures and is structured in functional blocks for better understanding.

A Motor with spindle drive

B Piston cylinder unit, in particular double stroke piston 10 and main cylinder piston C Auxiliary piston with travel simulator (WS)

D Valve connection

D1 for pressure regulation

D2 for control of double stroke piston 10, prefilling (VF) and pressure supply of main cylinder in the case of return stroke D3 Control of travel simulator (WS) with injection (ES)

A drive with a motor 8 with a ball screw drive (KGT) 7 and spindle 5 is arranged in block A which acts on a coupling 9 and a piston cylinder device, in particular with a double stroke piston 10. The coupling 9 is opened in the outlet position by a main cylinder return spring 123 acting via a coupling return spring 122 on a piston plunger 4 displaceably mounted in the spindle, said piston plunger being connected to a coupling plunger (KS). The piston plunger 4 then rests on a stop 121. If the motor 8 and the spindle 5, which acts on the double stroke piston 10, move, then the coupling 9 closes after a short coupling path and the spindle 5 is then coupled in both directions with the double stroke piston 10, which is required for the return stroke so that, as described, the double stroke piston (which can be configured as an annular piston) delivers volume into the brake circuits of compression rod piston 12a and floating piston 12 via EA valves. This coupling path has the advantage that the plunger is moved in the case of each braking. In the case of a jam, the piston does not return into the outlet position and can be diagnosed via residual pressure in the working chamber of the compression rod piston 12a and a motor sensor 6.

If the motor drive fails, a pedal plunger 3 acts on the piston plunger 4 after the free travel (LW) and thus on the compression rod piston 12a, which is integrated in the double stroke piston 10. In this case, volume is injected during the free travel from an auxiliary piston 116 via a normally open solenoid valve ESV and a solenoid valve AS and an open breather bore 120 directly into the compression rod brake circuit. The free travel is thus not received as loss of travel in the volume balance of the compression rod piston 10. This is possible by dynamic pressure occurring by way of the floating piston 12 and a choke D (screen) to a travel simulator WS, which enables an injection of pressure medium. In order for further optimisation, a normally closed shutoff valve 124 can be used together with a pressure relief valve ÜD.

In a special case, if the drive (motor/transmission) is locked and thus also the two pistons 12a, 12, pressure can also be built up or reduced from an auxiliary piston 116 via the valves EA.

After bridging the free travel, the pedal plunger 3 impinges on the piston plunger 4 and in the subsequent movement overcomes the force jump which results through the main cylinder return spring 23 and the pressure generated by the compression rod piston 12a. The speed-dependent dynamic pressure acts on the auxiliary piston 16 in this connection as a hydrodynamic force on the choke D. In the case of the force jump, the speed briefly becomes low, such that the pressure on the compression rod piston 12a does not fully add up to the dynamic pressure prior to impinging=dynamic pressure.

A small additional force jump thus occurs. The jump force can be defined by an elastic stop 21 with a transition function. This force jump is based on the pedal force prescribed by the legislator of 500 N for minimum braking in the fallback level in the range <10%, thus controllable by the driver. This jump force applies for the fallback level (RFE 3, i.e. failure of motor and vehicle electrical system). In the case of motor failure and intact ECU (=RFE 2), the auxiliary piston pressure in this range can be controlled by pulse width modulation (PWM) of the solenoid valve (ESV) and the solenoid valve (WA).

If, depending on the valve connection, even in the case of longer travel of the auxiliary piston 16, dynamic pressure has an effect which requires a higher pedal force which reduces the maximum pressure at e.g. 500 N pedal force, then a bypass can be used here in the auxiliary piston bore. This causes an outflow of fluid in the return flow with the corresponding piston position. Without this feature, a return flow from the auxiliary piston to the reservoir (VB) 11 is not required.

Unlike the embodiments described in the patent applications DE 10 2010 045 617.9 A1 and DE 10 2013 111 974.3 from the applicant, the valve ESV is, in addition to the valve WA, normally open, which enables the injection in the fallback level without significant disadvantages. Thus the variant with free travel and reduced main cylinder stroke is possible, which leads to notable structural length reduction and cost reduction. The lower delivery volume of the main cylinder with reduced stroke is balanced out by prefilling, as will be explained below in more detail.

The function of the travel simulator (WS) with the valves ESV, WA, RV0, RV1, D are described further in the patent applications DE 10 2010 045 617.9 A1 and DE 10 2013 111 974.3 from the applicant to which reference is hereby made in this respect.

The piston cylinder device with the main cylinder piston 12 and 12a and the double stroke piston 10 are contained in block B and the valve functions for ABS/ESP and pressure supply with control of the double stroke piston 10 are parallel.

The injection via the breather bore 120 was already described further above which substantially only applies for the fallback level (RFE). In the case of an intact motor, pedal travel sensors 2a and 2b deliver a signal to the motor control for the pressure build-up even after short pedal plunger travel. In this regard, the prefilling immediately comes into operation by closing the AS valve. In this connection, the full double stroke piston delivers a large volume from the area of the annular space 10a and the compression rod piston 12a even in the case of short travel which is used for prefilling. In this connection, an additional effect occurs by the prefilling volume flowing through the collar of the compression rod piston 12a and preventing it from being worn out by the breather bore. The prefilling should be e.g. speed-dependent, in the case of stage 1 small V a low pressure <10 bar and stage 2 high V<40 bar. In this connection, the measured pressure of the pressure sensor D6 or the current or the piston position can be used as the control signal. In the case of the special design of the double stroke piston with two pistons in particular with an annular piston, both the prefilling and the additional volume delivery can be carried out in the return stroke via only one valve (AS). In the case of other designs of the double stroke piston, two or a plurality of valves can or must be used for the prefilling.

The prefilling has two important advantages:
a. In the case of short brake pad—play, i.e. additional volume requirement, the pressure build-up so-called time to lock is faster which means brake travel reduction.
b. In the case of play LS, e.g. with rollback, the additional volume is not notably included in time to lock. In this connection, the brake pad play control described in the patent application DE 10 2008 051316.4 from the applicant to which reference is made here in this respect lends itself to the play control by controlling the negative pressure in the brake piston. In this connection, the play can be variably designed e.g. vehicle speed-dependent or dependent on the RFE. This play is a significant contribution to $CO_2$ reduction in the range of 1-2 g.
c. In the case of a large volume requirement in the main cylinder for full braking and great pedal speed, 50% greater volume is generated in the case of <40 with the same HZ stroke. The advantageous variant with free travel (LW) and shorter main cylinder travel is thus justified.
d. In the fallback level RFE1 (with failure of the travel simulator), a switch is carried out to a so-called slave booster because the pedal plunger here acts on the HZ piston in the case of the conventional brake force booster (BKV).

Since however in order to achieve greater pressures at 500 N of pedal force, as is well known, a small main cylinder diameter is used, the pedal travel without travel simulator WS is correspondingly significantly longer. This can be reduced by approximately 30% with prefilling. The greater prefilling volume can influence the piston position such that the floating piston 12 is possibly at the stop at an early stage. This can be prevented by the floating piston 12 being given a larger diameter. Otherwise, the stop is detected by pressure=f (piston travel), measured by the motor sensor. In the case of the stop, the return stroke volume (i.e. the volume that is delivered in the case of the return stroke) is injected into the brake circuit of the floating piston. The association of the pistons can also be detected via a floating circuit piston travel sensor 15 with target 15a in the piston.

In particular in the case of systems with recuperation, a pedal free travel between pedal plunger and the piston of the piston cylinder device, in particular double stroke piston 10 is advantageous, since due to the brake torque of the generator pressure does not have to be built up by the piston cylinder device. The brake torque is predetermined by a pedal travel sensor together with the travel simulator and divided into generator brake torque and brake torque corresponding to the pressure. If e.g. a small brake torque is predetermined by the driver, the generator brake torque is then sufficient. This applies up to a brake torque of approximately 30 bar which can be applied by the generator. The pedal travel range of approximately 5-8 mm corresponds to the free travel. The travel of the piston 10 of the piston cylinder device becomes shorter by this free travel since the pedal stroke is predetermined and a short stroke of the piston 10 results after the free stroke. In the fallback level, this stroke is omitted in the case of the entire volume delivery of the piston 10. According to the invention, volume from the auxiliary piston 116 is thus injected via the piston 10 and the open breather bore of the compression rod piston into the compression rod piston brake circuit.

The prefilling with greater volume must, however, be taken into consideration in the case of the pressure reduction since based on the pedal travel range, in particular in stage 1 of the travel simulator WS, the travel simulator piston still does not operate (see Description FIG. 1a). A pressure reduction $P_{ab}$ takes place here depending on the pedal travel reduction in the reservoir 11 via the outlet valves, as in the case of ABS. In order to control the double stroke piston 10, the valve AS and suction valves S2 and optionally S3 to the reservoir are required. S2 operates in the case of closed valve AS in the case of the return stroke and volume delivery via EA into the brake circuit. S3 is optionally required since in the case of prefilling, the valve AS is closed and what occurs here in the case of negative pressure cannot be balanced out as quickly after prefilling in the case of a re-opened valve AS.

In the case of the return stroke, a smaller spindle force and also motor torque operate in the case of corresponding dimensioning of the double stroke piston 10, which is advantageous in the case of high pressures. This phase can also be correspondingly designed by being used as a virtually free run in the case of applied prestroke for the high pressure range such that volume does not reach the pressure build-up $P_{auf}$ but rather reaches the reservoir 11 in the return flow. Volume for the high pressure range is then delivered only in the case of the subsequent return stroke.

The return stroke in the case of advantageous system variants with multiplex arrangement or operation (MUX in which the pressure build-up and the pressure reduction takes place in each case via only one valve in the brake lines) can take place during simultaneous pressure build-up $P_{auf}$ and pressure reduction $P_{ab}$ in separated brake circuits. To this end, an additional shutoff valve 17 is required.

The valves for ABS/ESR pressure control are located in block D1, which were described e.g. in the patent application DE 10 2013 111974.3 from the applicant to which reference is made here in this respect. In the case of conventional pressure control with inlet valves (EV) and outlet valves (AV), the pressure reduction $P_{ab}$ takes place through the outlet valves (AV) in the return flow to the reservoir 11.

The valve function of the valves AS and EA was already described in block D2. In the patent application DE 10 2013 111974.3 from the applicant, only one check valve is used instead of the valve EA. This is disadvantageous e.g. in the case of brake circuit failure, e.g. of the floating piston brake circuit, where supply by return stroke is not possible, since the return stroke volume is possibly delivered in the pressureless floating piston circuit. Since this is detected by diagnosis p=f (piston travel), no delivery takes place into the failed circuit in this case with the EA valve.

In the embodiment with MUX, the valves for pressure regulation have no return flow. For the case described of larger prefilling volume and pressure reduction $P_{ab}$ to balance out with shorter pedal travels, a valve $AV_x$ for pressure reduction $P_{ab}$ must be used here.

Block C contains the pedal interface with auxiliary piston 116, pedal travel sensors 2a and 2b and travel simulator WS. The functions are already described in previous applications from the applicant and also apply to the system design with double stroke pistons. The valve functions of block D3 were described in connection with injection ES. The diagnosis of the breather bore 120 in the compression rod piston 12a should also be mentioned which is not always possible with conventional brake systems. This case occurs by way of tolerance shifts or disruptions during operation. If the breather bore remains closed, pressure balance in the brake circuit is not possible. This results in a negative pressure in the case of lower temperatures with possible play if the brake piston reacts to this or in the case of high temperature a residual pressure in the brake circuit leads to a residual brake effect with possible temperature increase in the brake.

In the case of the proposed system with prefilling, a residual pressure in the compression rod piston brake circuit still remains in the range of the free travel LW which can be controlled via the valves AV and ESV. In this case, valve ESV is closed and valve EA is open; differential pressure does not thereby occur on the collar since the pressure in the brake circuit of the compression rod piston and double stroke piston brake circuit is equal. In the case of pedal travel=0 (i.e. outlet position), the valve EA is closed and the valve ESV is open. The following pressure change is an indication that the breather bore is open. This method can be used for each braking or at large intervals.

FIG. 15a shows the adaptive behaviour of the travel simulator WS. The travel simulator WS has at least three stages in terms of its characteristics:

Stage 1: Pedal return effect is generated via the pedal return spring 118. Valve WA open. This stage is dimensioned e.g. with 7-8 mm pedal plunger travel and towards the end results in a system pressure of approximately 30 bar. This pressure corresponds approximately to the braking with a high recuperation torque of the generator. The described free travel LW of the pedal plunger corresponds to approximately the previously mentioned travel which means that in the case of recuperation the actuator with motor drive is not enabled which requires approximately 80% fewer load cycles.

Stages 2 and 3: Valve WA closed, volume of the auxiliary piston 16 reaches in the travel simulator piston with specific force-pressure characteristics with stop.

In the case of known systems, the stop of the travel simulator is associated with a fixed pedal travel via a valve WA. According to an advantageous inventive aspect, a solution is now proposed, in which the travel simulator is adaptive e.g. in the case of fading which is detectable due to the function p=f (vehicle deceleration). The stop is normally reached in the case of N. In the case of fading which is detectable by high pressure in relation to the vehicle deceleration, the stop can be shifted to F by control of the valve WA. In the case of low p, this is also detected and the stop can be provided in the case of shorter pedal travels. As is well known, the conventional ABS operates even in the case of shorter pedal travels E1. This can also be generated by the pressure reaching in the auxiliary piston via open valves EA and ESV through prestroke and pushes back or modulates the latter or via closed valve EA and open valve ESV with return stroke.

FIG. 16 shows simplified valve connections without details of the regions A-C. In the region D2, only one 3/2 way EA valve with check valve is used for the pressure supply of the brake circuits. The volume is delivered in the floating circuit without connecting the valve EA in the case of the return stroke of the double stroke piston. In the case of connecting the EA valve, delivery takes place in the floating piston brake circuit and the brake circuit of the compression rod piston. In the case of failure in the floating piston brake circuit, delivery is only carried out in the floating piston brake circuit. The compression rod circuit also has the advantage with the double stroke piston that a failure of the collar is very quickly detected by the pressure and piston travel monitor. In this case, delivery is nonetheless carried out in the compression rod brake circuit with closed valve ESV. In this connection, the driven piston pressure is balance out with open valve AS.

A further simplification is possible in the case of the travel simulator WS. The normally open valve ESU is replaced with a check valve RVS. This solution has the disadvantage of the travel simulator pressure being shifted in the double stroke piston and causing additional seal friction. In an extreme case, the WS pressure may become greater than the pressure in the compression rod piston brake circuit in the case of very high pedal forces. In this case, the ABS function must be switched off. This can be avoided if the piston movement of the travel simulator WS (see dashed line) is expanded for additional closure of the check valve. In the case of this simplification, pedal reaction cannot be generated in the case of the adaptive travel simulator.

FIG. 17 shows a constructive variant by the auxiliary piston being shifted from the pedal interface in block B. In this connection, the pedal plunger 3 acts on the annular auxiliary piston 119 via a bridge, said auxiliary piston being mounted between double stroke piston 10 and the housing 125 thereof. The pedal stroke 3 also acts on the coupling 9. The pedal return spring 18 acts on the auxiliary piston 119 analogously to FIG. 15. The movement of the auxiliary piston 19 can alternatively be detected here at another point by the slave pedal travel sensor 2b. The advantage is the overview of all hydraulic functions in one block without long supply lines to the pedal interface corresponding to FIG. 15.

For future vehicle platform modularity, the systems should be able to be used via numerous models for left-hand drive vehicles and also for right-hand drive vehicles. In this regard, the right-hand drive vehicle has problems in the case of the transverse mounting of the combustion motor. A 2-box solution lends itself in this situation by only the main cylinder with small dimensions, in particular tandem main cylinder with auxiliary piston (16) being mounted on the bulkhead of the vehicle and the drive (or motor/transmission) valve module flexibly in the motor compartment of the vehicle.

LIST OF REFERENCE NUMERALS

1 Brake pedal
2 Pedal travel sensors
3 Pedal plunger
4 Piston plunger
5 Spindle
6 Motor sensor
7 KGT
8 EC motor
9 Coupling
9a Magnetic coupling
9b Direct coupling of spindle with double stroke piston
10 double stroke piston
10a Annular space
10b Pressure chamber
11 Reservoir
12 floating piston
12a driven piston
12b floating piston enlarged
13 Piston cylinder unit
14 Pedal interface
15 floating piston positioning sensor
15a Target for positioning sensor
16 Auxiliary piston 17 Plunger piston
18 Level sensor
19 Electrical connections to ECU
20 Electrodes
21 Leakage flow
22 Housing extension
23 Separation chamber
24 Sponge
25 Outlet channels
26 Screen
27 driven piston collar
28 Annular piston
28a Annular piston seal
29 Return spring
30 Bending rod
31 driven pressure piston
32 Securing ring
33 Plunger
34 Seal
35 Primary seal
36 Secondary seal
37 Stop spring
38 Differential piston
39 Differential piston seal
40 Breather bore
43 Working chamber
45 Piston cylinder unit
46 Piston cylinder unit
115 floating piston positioning sensor
116 Auxiliary piston
116a Bypass for Hiko
117 Shutoff valve for MUX
118 Pedal return spring
119 Annular auxiliary piston
120 Breather bore
121 Stop for piston plunger (KS)
122 Return spring for KS
123 HZ return spring
123a HZ return spring
124 Shutoff valve to WS
125 double stroke piston housing
WS Travel simulator connection
AS Shutoff valve
WA WS cut-off valve
WSA WS shutoff valve
ESV Injection valve
EA Inlet/outlet valve
SV Switch valve
E Inlet valve
A Outlet valve
SiV Safety valve
RZ Wheel cylinder
R Return flow line
BKV Brake force booster
DG Pressure sensor
RFE Fallback level
VH Prestroke of the double stroke piston
RH Return stroke of the double stroke piston
$T_D$ Diagnosis time
S1 Suction valve
S2 Suction valve
S3 Suction valve
Ü Pressure relief valve for prefilling (VF)
R5 Check valve to the brake circuit
TV1 HiKo isolation valve
TV2 Isolation valve to the driven piston circuit
TV3 Isolation valve to the floating piston circuit
UV Changeover valve
VB Reservoir
LW Free travel

What is claimed is:

1. An actuation device for a vehicle brake, comprising:
an actuation device in the form of a brake pedal,
at least one piston cylinder unit which is connected to the vehicle brake via a hydraulic brake circuit to supply pressure medium to the brake circuit and to apply pressure on the vehicle brake, and
an electromotive drive for the piston cylinder unit,
wherein the at least one piston cylinder unit includes a piston arranged to be directly driven by the electromotive drive, wherein said piston is a double-stroke piston arranged to supply pressure medium to the brake circuits in a controlled manner in both movement directions of the piston, forward stroke and return stroke, wherein at least a first pressure chamber limited by the driven piston supplies pressure medium at the forward stroke and at least a second pressure chamber supplies pressure medium at the return stroke, and wherein both pressure chambers are able to be connected by a valve device comprising at least one valve, and
wherein an area of the double-stroke piston that is effective at the forward stroke is of a different size from an area that is effective at the return stroke, wherein the different effective areas are able to be used for reduction of a piston force or a motor moment by connecting the effective area at the return stroke with the area effective at the forward stroke with at least one solenoid valve.

2. The actuation device according to claim 1, wherein the connection between the first and second pressure chambers by the valve device, including the at least one valve, is a direct connection, whereby the valve device is arranged without any other valves or other components between the first and second pressure chambers and the valve device.

3. The actuation device according to claim 1, wherein, by actuating the valve device, the double-stroke piston is enabled to provide a continuous pressure increase by supplying pressure medium at the forward stroke and the return stroke.

4. The actuation device according to claim 1, wherein the double-stroke piston is enabled to be used for pre-filling wheel brakes with pressure medium at the beginning of braking by conducting corresponding volume into the brake circuit.

5. The actuation device according to claim 1, wherein pressure medium from a further piston-cylinder unit reaches the double-stroke piston by means of an auxiliary piston and a valve device.

6. The actuation device according to claim 1, wherein the piston cylinder unit forms an annular space from which the pressure medium is enabled to be supplied to at least one brake circuit.

7. The actuation device according to claim 1, wherein the at least one piston cylinder unit comprises one or more pistons, and wherein the supply of the pressure medium takes place in at least one pressure chamber associated with the one or more pistons of the at least one piston cylinder unit.

8. The actuation device according to claim 1, further comprising valves configured to control supply of the pressure medium.

9. The actuation device according to claim 1, wherein volume control and injection in at least one brake circuit takes place via a return stroke of the piston.

10. The actuation device according to claim 1, wherein supply of the pressure medium by means of the piston in at least two brake circuits takes place simultaneously or serially, and wherein the actuation device further comprises a closing valve.

11. The actuation device according to claim 1, further comprising at least one securing valve provided in a supply line for the pressure medium.

12. The actuation device according to claim 1, further comprising a mechanical coupling arranged for separating the drive and the piston driven by the drive in case of brake system failure.

13. The actuation device according to claim 1, further comprising a positioning sensor for the driven piston and configured for controlling supply of the pressure medium.

14. The actuation device according to claim 1, further comprising a reservoir configured to balance out supplied pressure medium volume.

15. The actuation device according to claim 1, wherein a diagnosis of valves and seals takes place during a normal operating process.

16. The actuation device according to claim 1, wherein pressure medium from a further piston-cylinder unit reaches the double-stroke piston by means of an auxiliary piston and via a valve.

17. A double-stroke piston for a hydraulic actuation device, wherein the double stroke piston is configured according to claim 1.

18. The actuation device according to claim 1, further comprising a housing extension provided on a drive housing, said housing extension forming at least one outlet channel for leakage fluid.

19. The actuation device according to claim 18, wherein a separation chamber is formed in a lower part of the housing extension.

20. The actuation device according to claim 18, further comprising a fluid sensor arranged in a lower part of the housing extension.

21. The actuation device according to claim 1, wherein the piston cylinder unit and the drive are spatially arranged at least partially adjacent or parallel and are arranged in one unit.

22. The actuation device according to claim 1, wherein the piston arranged to be driven by the drive is configured as an annular piston, a working chamber of which is arranged at least partially parallel to a further piston-cylinder unit.

23. The actuation device according to claim 1, wherein working chambers of the piston-cylinder unit are connected via a hydraulic line, in which a valve is connected.

24. The actuation device according to claim 1, wherein suction valves are associated with delivery directions of the piston.

25. The actuation device according to claim 1, further comprising an auxiliary piston, a working chamber of which is connected via a hydraulic line to a travel simulator, and a changeover valve arranged in the hydraulic line, said changeover valve connecting the working chamber of the auxiliary piston to that of the driven piston in a currentless manner.

26. The actuation device according to claim 1, wherein a piston of the piston cylinder unit is arranged parallel to a further piston of the piston cylinder unit, and wherein a solenoid valve is arranged in a hydraulic line connecting working chambers of the pistons.

27. The actuation device according to claim 1, further comprising isolation valves are arranged in lines leading to wheel brakes and suction valves arranged in lines leading to a reservoir.

28. The actuation device according to claim 1, wherein a free travel is provided between the brake pedal or a pedal plunger and a spindle or between a coupling plunger and the spindle, wherein the spindle is connected to the piston via a bending rod or a coupling.

29. The actuation device according to claim 1, further comprising a further piston cylinder unit arranged parallel or concentrically to the piston cylinder unit.

30. A method for operating a brake device, wherein the brake device comprises an actuating device having an electro-hydraulic drive, a main piston-cylinder device configured to supply hydraulic pressure medium to brake circuits, a valve device configured to control or regulate supply of the pressure medium, and an electronic control or regulating device, the method comprising:
supplying pressure medium volume in a controlled manner to at least one brake circuit by means of a further piston cylinder device, which is part of the actuating device and further includes a double-stroke piston, having a forward stroke and a return stroke, and at least one valve controlled by the control or regulating device, wherein an area of the double-stroke piston that is effective at the forward stroke is of a different size from an area that is effective at the return stroke, wherein the different areas are able to be used for reduction of a piston force or a motor moment by connecting the area effective at the return stroke with the area effective at the forward stroke by at least one valve.

31. The method according to claim 30, wherein a direct connection between first and second pressure chambers of the double-stroke piston is made by the valve device, wherein the valve device comprises at least one valve, whereby the valve device is arranged without any other valves or other components between the first and second pressure chambers and the valve device.

32. The method according to claim 30, further comprising actuating the valve device to thereby enable the double-stroke piston to provide a continuous pressure increase by supplying pressure medium at the forward stroke and the return stroke.

33. The method according to claim 30, further comprising pre-filling wheel brakes with pressure medium at the beginning of braking by conducting corresponding volume into the brake circuit.

34. The method according to claim 30, further comprising conducting pressure medium from a further piston-cylinder unit to the double-stroke piston by means of an auxiliary piston and a valve device.

35. The method according to claim 34, further comprising separating, using a valve device, a travel simulator from a hydraulic connection between the further piston cylinder unit and a brake circuit.

36. The method according to claim 34, further comprising injecting volume from the auxiliary piston via a piston and an open breather bore of the at least one brake circuit which is supplied with pressure medium by the at least one piston.

37. The method according to claim 34, further comprising detecting movement of the auxiliary piston by a slave travel sensor.

38. A brake device, comprising:
an actuation device,
an electro-hydraulic drive, a main piston cylinder device arranged to supply hydraulic pressure medium to brake circuits, a valve device configured to control or regulate a supply of the pressure medium, and an electronic control or regulating device (ECU), wherein the actuation device, the electro-hydraulic drive, the main piston cylinder device, the valve device and the ECU are configured to implement the method according to claim 30, wherein the brake device further comprises a 3/2-way solenoid valve having a downstream check valve and connected in a hydraulic line from the double stroke piston to the pressure chambers of the main piston cylinder unit or to brake circuit lines associated with said pressure chambers.

39. The brake device according to claim 38, wherein, instead of the 3/2-way solenoid valve, a check valve is provided in the hydraulic line from an auxiliary piston to the main piston cylinder device, and wherein, alternatively, an additional control of the check valve by means of a piston of a travel simulator is possible, so that in the case of high pressures in the travel simulator, pressure to the double stroke piston is restricted.

40. The brake device according to claim 39, wherein the auxiliary piston is arranged in a region between the drive and the main piston cylinder unit and is configured as an annular piston.

41. The brake device according to claim 39, wherein the travel simulator is adaptive in terms of its characteristics and comprises at least two stages.

42. The brake device according to claim 38, wherein the device comprises a modular structure, wherein the essential components of the device are combined in one (1-box) or in two assemblies (2-box).

43. The brake device according to claim 42, wherein, in the 2-box arrangement, the main piston cylinder unit and a travel simulator are combined in a first unit, and wherein the drive and valves of a hydraulic control unit are combined in a second unit.

44. The method according to claim 30, further comprising supplying additional pressure medium volume in case of a system failure.

45. The method according to claim 30, wherein pressure medium volume is supplied using a pressure signal or a motor current of the piston stroke and a pedal speed.

46. The method according to claim 30, wherein both pressure chambers of the double-stroke piston are connected to a reservoir, whereby hydraulic volume from one or both chambers is able to be released into the reservoir.

47. The method according to claim 30, further comprising controlling one brake circuit using a multiplex method and controlling another brake circuit by inlet/outlet valves.

48. The method according to claim 47, wherein the controlling using the multiplex method and the controlling another brake circuit using inlet/outlet valves comprises increasing pressure is increased in one brake circuit and simultaneously decreasing pressure in the another brake circuit using a further piston cylinder unit or outlet valves.

49. The method according to claim 30, further comprising, at a failure of the actuating device, supplying hydraulic volume by the further piston cylinder device via the valve device into at least one brake circuit and/or a pressure chamber of the main piston cylinder device and thereby hydraulically moving the piston of the main piston cylinder device configured to transmit pressure to another brake circuit.

50. A method for actuating a vehicle brake, comprising:
driving a piston by an electromotive drive of at least one piston-cylinder unit, wherein said piston is a double-stroke piston and is driven by the electromotive device to supply pressure medium to at least one brake circuit in a controlled manner in both movement directions of the piston, forward stroke and return stroke, and wherein the piston-cylinder unit includes at least a first pressure chamber and at least one second pressure chamber, the at least one first and at least one second pressure chambers being separated by the piston, wherein the at least one first pressure chamber supplies pressure medium on the forward stroke and the at least one second pressure chamber supplies pressure medium on the return stroke, wherein an area of the piston that is effective at the forward stroke is of a different size from an area of the piston that is effective at the return stroke; and
controlling at least one valve such that the at least one first pressure chamber and the at least one second pressure chamber are at least temporarily connected to each other to enable reducing a piston force or a motor moment.

* * * * *